US 8,095,951 B1

(12) United States Patent
Kunkel et al.

(10) Patent No.: US 8,095,951 B1
(45) Date of Patent: Jan. 10, 2012

(54) SYSTEMS AND METHODS FOR PROVIDING A SCAN

(75) Inventors: Gerard Kunkel, Yardley, PA (US); Jon P. Radloff, Castle Rock, CO (US); Michael D. Ellis, Boulder, CO (US); Michael L. Craner, Exton, PA (US); Rajeshwari B. Iyer, Erie, CO (US); Andrzej Jakubowski, Lakewood, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 598 days.

(21) Appl. No.: 11/430,516

(22) Filed: May 8, 2006

Related U.S. Application Data

(60) Provisional application No. 60/686,229, filed on May 31, 2005, provisional application No. 60/678,494, filed on May 6, 2005.

(51) Int. Cl.
*G06F 3/00* (2006.01)
*G06F 13/00* (2006.01)
*H04N 5/445* (2011.01)

(52) U.S. Cl. ................. 725/38; 725/37; 725/39; 725/52
(58) Field of Classification Search .................. 348/732; 725/37, 38, 39, 44, 45, 46, 52
See application file for complete search history.

(56) References Cited

U.S. PATENT DOCUMENTS

| 5,557,338 A | 9/1996 | Maze et al. |
| 5,583,560 A | 12/1996 | Florin et al. |
| 5,589,892 A | 12/1996 | Knee et al. |
| 5,614,940 A | 3/1997 | Cobbley et al. |
| 5,629,733 A | 5/1997 | Youman et al. |
| 5,801,787 A | 9/1998 | Schein et al. |
| 5,818,541 A | 10/1998 | Matsuura et al. |
| 5,886,746 A | 3/1999 | Yuen et al. |
| 5,900,916 A | 5/1999 | Pauley |
| 5,986,650 A | 11/1999 | Ellis et al. |
| 6,016,141 A | 1/2000 | Knudson et al. |

(Continued)

FOREIGN PATENT DOCUMENTS

EP 0 854 645 A2 7/1998

(Continued)

OTHER PUBLICATIONS

U.S. Appl. No. 11/431,143, filed May 8, 2006.

(Continued)

*Primary Examiner* — Kristine Kincaid
*Assistant Examiner* — John Schnurr
(74) *Attorney, Agent, or Firm* — Ropes & Gray LLP

(57) ABSTRACT

Systems and methods for a video scan are provided. The scan may be dynamically interactive and a function of characteristics of the programs in the scan (e.g., commercial breaks or the end of a program approaching) The scan may simultaneously display multiple scan windows for a plurality of programs, for example in a scan wizard. The scan wizard allows the user to simultaneously view a scan window and an information panel, select criteria for the scan from a criteria panel, and control the scan using a scan control panel. The scan may allow the user to record a program displayed in the scan without interrupting the scan (e.g., by using an additional tuner). The scan may display, within the scan interface, trick-play functions for appropriate scanned programs (e.g., recorded, cached and on-demand programs). The user may select and perform trick-play functions for a scanned program without exiting the scan mode.

17 Claims, 33 Drawing Sheets

U.S. PATENT DOCUMENTS

| | | | |
|---|---|---|---|
| 6,072,535 | A | 6/2000 | Kearns |
| 6,151,059 | A | 11/2000 | Schein et al. |
| 6,177,931 | B1 | 1/2001 | Alexander et al. |
| 6,226,444 | B1 | 5/2001 | Goldschmidt et al. |
| 6,226,618 | B1 | 5/2001 | Downs et al. |
| 6,239,794 | B1 | 5/2001 | Yuen et al. |
| 6,323,911 | B1 | 11/2001 | Schein et al. |
| 6,324,338 | B1 | 11/2001 | Wood et al. |
| 6,384,869 | B1 | 5/2002 | Sciammarella et al. |
| 6,388,714 | B1 | 5/2002 | Schein et al. |
| 6,418,556 | B1 | 7/2002 | Bennington et al. |
| 6,425,129 | B1 | 7/2002 | Sciammarella et al. |
| 6,452,620 | B1 | 9/2002 | Kapushinski et al. |
| 6,536,041 | B1 | 3/2003 | Knudson et al. |
| 6,563,515 | B1 | 5/2003 | Reynolds et al. |
| 6,564,378 | B1 | 5/2003 | Satterfield et al. |
| 6,614,987 | B1 | 9/2003 | Ismail et al. |
| 6,637,029 | B1 | 10/2003 | Maissel et al. |
| 6,651,253 | B2 | 11/2003 | Dudkiewicz et al. |
| 6,756,997 | B1 | 6/2004 | Ward, III et al. |
| 6,813,777 | B1 | 11/2004 | Weinberger et al. |
| 6,832,385 | B2 * | 12/2004 | Young et al. ............... 725/39 |
| 6,865,746 | B1 | 3/2005 | Herrington et al. |
| 6,868,225 | B1 | 3/2005 | Brown et al. |
| 6,897,904 | B2 | 5/2005 | Potrebic et al. |
| 6,898,762 | B2 | 5/2005 | Ellis et al. |
| 6,906,643 | B2 | 6/2005 | Samadani et al. |
| 6,934,964 | B1 | 8/2005 | Schaffer et al. |
| 6,978,310 | B1 | 12/2005 | Rodriguez et al. |
| 7,003,791 | B2 | 2/2006 | Mizutani |
| 7,007,294 | B1 | 2/2006 | Kurapati |
| 7,013,478 | B1 | 3/2006 | Hendricks et al. |
| 7,047,547 | B2 | 5/2006 | Alten et al. |
| 7,055,166 | B1 | 5/2006 | Logan et al. |
| 7,062,777 | B2 | 6/2006 | Alba et al. |
| 7,096,185 | B2 | 8/2006 | Reichardt et al. |
| 7,100,185 | B2 | 8/2006 | Bennington et al. |
| 7,165,098 | B1 | 1/2007 | Boyer et al. |
| 7,206,892 | B2 | 4/2007 | Kim et al. |
| 7,213,089 | B2 | 5/2007 | Hatakenaka |
| 7,227,583 | B2 | 6/2007 | Sin |
| 7,283,992 | B2 | 10/2007 | Liu et al. |
| 7,296,284 | B1 | 11/2007 | Price et al. |
| 7,313,805 | B1 | 12/2007 | Rosin et al. |
| 7,334,195 | B2 | 2/2008 | Gemmell et al. |
| 7,380,263 | B2 | 5/2008 | Shintani |
| 7,386,871 | B1 | 6/2008 | Knudson et al. |
| 7,458,093 | B2 | 11/2008 | Dukes et al. |
| 7,603,685 | B2 | 10/2009 | Knudson et al. |
| 7,748,018 | B2 | 6/2010 | Young et al. |
| 7,783,632 | B2 | 8/2010 | Richardson et al. |
| 7,818,763 | B2 | 10/2010 | Sie et al. |
| 2002/0056119 | A1 | 5/2002 | Moynihan |
| 2002/0059595 | A1 | 5/2002 | Goldschmidt Iki et al. |
| 2002/0059610 | A1 | 5/2002 | Ellis |
| 2002/0075402 | A1 | 6/2002 | Robson et al. |
| 2002/0078453 | A1 | 6/2002 | Kuo |
| 2002/0113895 | A1 | 8/2002 | Takagi et al. |
| 2002/0157099 | A1 | 10/2002 | Schrader et al. |
| 2002/0165770 | A1 | 11/2002 | Khoo et al. |
| 2002/0174430 | A1 | 11/2002 | Ellis et al. |
| 2002/0194600 | A1 * | 12/2002 | Ellis et al. ............... 725/41 |
| 2003/0066077 | A1 * | 4/2003 | Gutta et al. ............... 725/34 |
| 2003/0093790 | A1 * | 5/2003 | Logan et al. ............... 725/38 |
| 2003/0093792 | A1 | 5/2003 | Labeeb et al. |
| 2003/0093803 | A1 | 5/2003 | Ishikawa et al. |
| 2003/0105589 | A1 | 6/2003 | Liu et al. |
| 2003/0110499 | A1 | 6/2003 | Knudson et al. |
| 2003/0149621 | A1 | 8/2003 | Shteyn |
| 2003/0192061 | A1 | 10/2003 | Hwangbo et al. |
| 2003/0196201 | A1 | 10/2003 | Schein et al. |
| 2003/0226145 | A1 | 12/2003 | Marsh |
| 2004/0003394 | A1 | 1/2004 | Ramaswamy |
| 2004/0003399 | A1 * | 1/2004 | Cooper ............... 725/38 |
| 2004/0019908 | A1 | 1/2004 | Williams et al. |
| 2004/0064835 | A1 | 4/2004 | Bellwood et al. |
| 2004/0070593 | A1 | 4/2004 | Neely et al. |
| 2004/0103434 | A1 | 5/2004 | Ellis |
| 2004/0117831 | A1 | 6/2004 | Ellis et al. |
| 2004/0131336 | A1 | 7/2004 | Matsuno et al. |
| 2004/0177370 | A1 | 9/2004 | Dudkiewicz |
| 2004/0210926 | A1 | 10/2004 | Francis et al. |
| 2004/0210932 | A1 | 10/2004 | Mori et al. |
| 2004/0239812 | A1 | 12/2004 | Park et al. |
| 2004/0244051 | A1 | 12/2004 | Kim et al. |
| 2004/0268413 | A1 | 12/2004 | Reid et al. |
| 2005/0028208 | A1 | 2/2005 | Ellis et al. |
| 2005/0066370 | A1 | 3/2005 | Alvarado et al. |
| 2005/0080497 | A1 | 4/2005 | Rao |
| 2005/0080769 | A1 | 4/2005 | Gemmell et al. |
| 2005/0102696 | A1 | 5/2005 | Westberg |
| 2005/0108754 | A1 | 5/2005 | Carhart et al. |
| 2005/0120373 | A1 | 6/2005 | Thomas et al. |
| 2005/0158023 | A1 | 7/2005 | Takasu et al. |
| 2005/0160461 | A1 | 7/2005 | Baumgartner et al. |
| 2005/0188402 | A1 | 8/2005 | de Andrade et al. |
| 2005/0204388 | A1 | 9/2005 | Knudson et al. |
| 2005/0240967 | A1 | 10/2005 | Anderson et al. |
| 2005/0246732 | A1 | 11/2005 | Dudkiewicz et al. |
| 2005/0251828 | A1 | 11/2005 | Young et al. |
| 2005/0259963 | A1 | 11/2005 | Sano et al. |
| 2006/0026635 | A1 | 2/2006 | Potrebic et al. |
| 2006/0026665 | A1 | 2/2006 | Rodriguez et al. |
| 2006/0051059 | A1 * | 3/2006 | Krakirian et al. ............... 386/83 |
| 2006/0053449 | A1 | 3/2006 | Gutta |
| 2006/0101490 | A1 | 5/2006 | Leurs |
| 2006/0150214 | A1 | 7/2006 | Ramraz et al. |
| 2006/0173838 | A1 | 8/2006 | Garg et al. |
| 2006/0174269 | A1 | 8/2006 | Hansen-Turton |
| 2006/0218573 | A1 | 9/2006 | Proebstel |
| 2006/0218604 | A1 | 9/2006 | Riedl et al. |
| 2006/0253874 | A1 | 11/2006 | Stark et al. |
| 2006/0271953 | A1 | 11/2006 | Jacoby et al. |
| 2006/0294574 | A1 | 12/2006 | Cha |
| 2007/0039023 | A1 | 2/2007 | Kataoka |
| 2007/0055979 | A1 | 3/2007 | Van Gassel et al. |
| 2007/0055989 | A1 | 3/2007 | Shanks et al. |
| 2007/0074245 | A1 | 3/2007 | Nyako et al. |
| 2007/0078822 | A1 | 4/2007 | Cucerzan et al. |
| 2007/0089132 | A1 | 4/2007 | Qureshey et al. |
| 2007/0130089 | A1 | 6/2007 | Chiu |
| 2007/0136749 | A1 | 6/2007 | Hawkins et al. |
| 2007/0162850 | A1 | 7/2007 | Adler et al. |
| 2007/0186240 | A1 | 8/2007 | Ward et al. |
| 2008/0092155 | A1 | 4/2008 | Ferrone et al. |
| 2008/0092156 | A1 | 4/2008 | Ferrone |
| 2008/0104057 | A1 | 5/2008 | Billmaier et al. |
| 2008/0104127 | A1 | 5/2008 | Billmaier et al. |
| 2008/0184294 | A1 | 7/2008 | Lemmons et al. |
| 2010/0107194 | A1 | 4/2010 | McKissick et al. |

FOREIGN PATENT DOCUMENTS

| | | | |
|---|---|---|---|
| EP | 1363452 | A1 | 11/2003 |
| EP | 1 463 307 | A2 | 9/2004 |
| WO | WO97/50251 | | 12/1997 |
| WO | WO98/06219 | | 2/1998 |
| WO | WO98/38831 | | 9/1998 |
| WO | WO99/45702 | | 9/1999 |
| WO | WO00/11869 | | 3/2000 |
| WO | WO00/33573 | | 6/2000 |
| WO | WO00/33576 | | 6/2000 |
| WO | WO01/76249 | | 10/2001 |
| WO | WO01/91458 | | 11/2001 |

OTHER PUBLICATIONS

U.S. Appl. No. 12/189,386, filed Aug. 11, 2008.
U.S. Appl. No. 11/431,128, filed May 8, 2006.
U.S. Appl. No. 08/679,652, filed Jul. 11, 1996.
U.S. Appl. No. 09/561,165, filed Apr. 28, 2000.
U.S. Appl. No. 08/668,930, filed Jun. 24, 1996.
U.S. Appl. No. 10/225,526, filed Aug. 20, 2002.
U.S. Appl. No. 11/412,549, filed Apr. 27, 2006.
U.S. Appl. No. 09/332,224, filed Jun. 11, 1999, Ellis et al.
U.S. Appl. No. 09/437,304, filed Nov. 9, 1999, Boyer et al.

U.S. Appl. No. 10/105,128, filed Feb. 21, 2002, Ellis et al.
U.S. Appl. No. 10/347,673, filed Jan. 17, 2003, Knudson et al.
U.S. Appl. No. 10/927,814, filed Aug. 26, 2004, Ellis et al.
U.S. Appl. No. 11/179,710, filed Jul. 12, 2005, Ellis et al.
U.S. Appl. No. 11/324,202, filed Dec. 29, 2005, Yates.
U.S. Appl. No. 11/541,299, filed Sep. 29, 2006, Shannon et al.
U.S. Appl. No 60/848,600, filed Sep. 29, 2006, Ferrone.

Van Barneveld et al., "Designing Usable Interfaces for TV Recommender Systems," Personalized Digital Television, 6:259-286 (2004).
U.S. Appl. No. 11/431,153, filed May 8, 2006.
U.S. Appl. No. 13/049,792, filed Mar. 16, 2011.

* cited by examiner

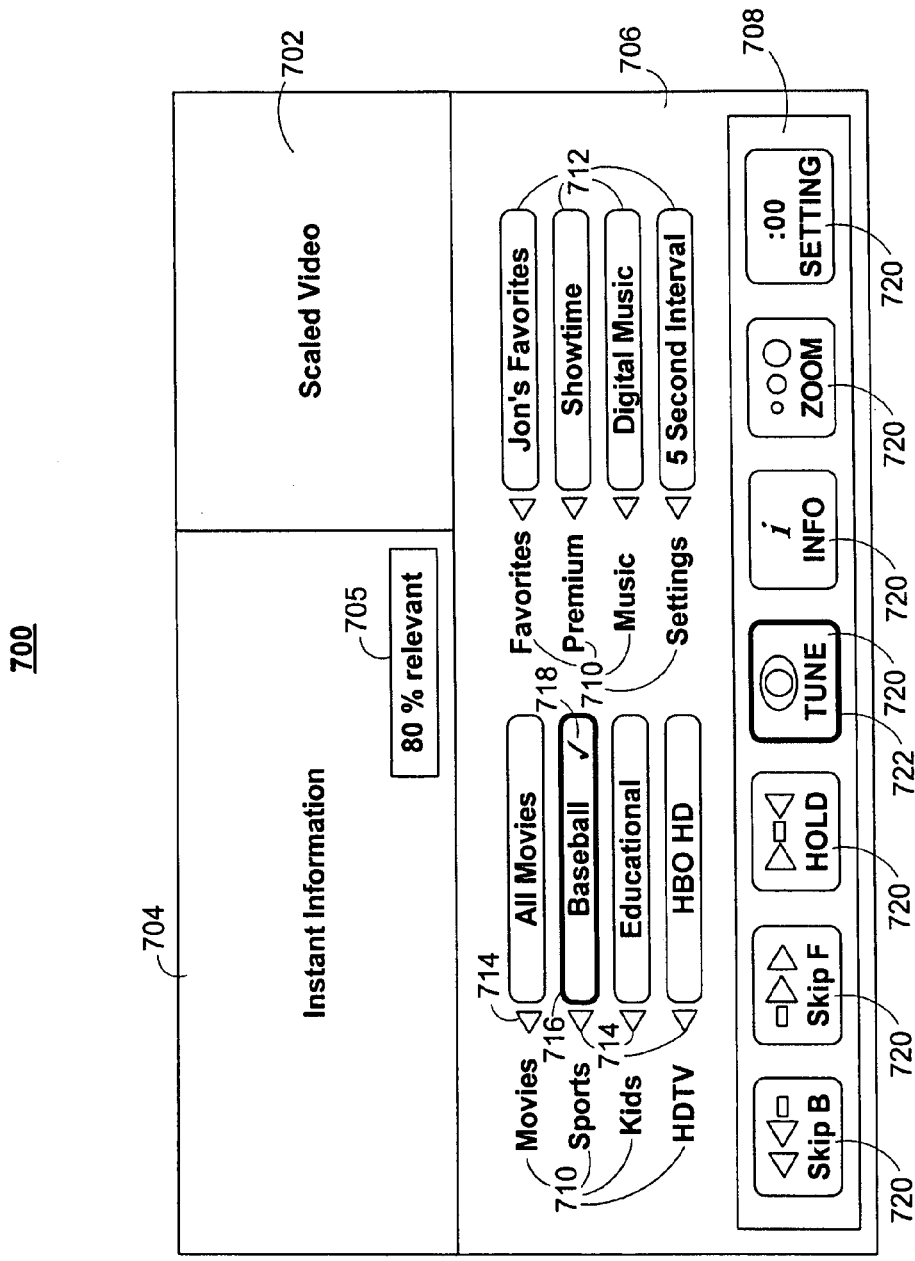

No favorites set. Scanning all channels.

2500

Starting Scan of favorite channels, titles and categories. Press ok to pause and exit to stop scan.

2600

2700

Animated TV icon. The TV screen fades out two or three times a second.

Emeril
7-8p
"Gimme Garlic", New, (2004), Garlic-infused oil and...
48 FOOD    7:03pm

```
Exiting scan.
You can restart scan by clicking favorites
twice quickly or by using the scan button
from the quick menu.
```

```
Scan paused...
Press ok, fav or channel up/down to resume
scan.
Press exit to stop scan and return to
regular viewing mode.
```

| Icon | Description |
|---|---|
|  | This icon is used on the face of a button in the quick menu. This button provides an interface to the user to start scanning. An animated version of this icon (where the central screen fades in) is used on the flip bar when scan is active. |
|  | Expand all Categories to all levels. An action button in the category selection screen that allows all categories and subcategories to be visible in the list. This button toggles with the collapse all categories button below. |
|  | Collapse all subcategories to root level. An action button in the category selection screen that allows all subcategories to be collapsed into the root level. This button toggles with the expand all categories button above. |
|  | Show channels carrying this category. In the category detailed information screen, this action button allows the user to see all channels carrying this category. In other embodiments, it may also allow the user to switch from a title to channels carrying that title. |
|  | Show Titles matching this category. In the category detailed information screen, this action button allows the user to see all titles matching this category. In other embodiments it may also allow the user to see titles carried by a channel. |
|  | Subcategories of this category have been selected as favorites, while this category itself is not selected as favorite. |
|  | This category or channel or title has been selected as favorite. |

| Icon | Description |
|---|---|
|  | The parent category of this subcategory has been selected as a favorite. As a result, this category has been implicitly selected as favorite. However, this category has not been selected explicitly as favorite. |
|  | Collapsed icon. The category associated with this icon has sub categories that are not displayed. Select this icon, and click "ok", down arrow or page down arrow, and the subcategories will be displayed. This icon toggles with the "expanded icon". |
|  | Expanded icon. All subcategories related to the category associated with this icon have been displayed. Selecting this icon, pressing ok, up arrow or page up arrow will toggle this icon to the collapsed icon, and hide all the sub categories. |
| 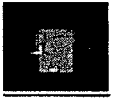 | Leaf Node icon. The category associated with this icon has no sub categories. In some embodiments, the user may not navigate to this icon using the arrow keys. This icon is presented as a placeholder so that the tree nodes align properly. |
|  | Clear favorites in the current screen. Selecting this button in the categories screen will only clear the favorites among categories and not favorite channels or favorite titles. |
|  | Search the current screen/page. This spares the user having to search the whole page using page up and page down. |

| Guide | The guide displays a list of programs scanned. This allows the user to change the position of the scan to any program in the scanned program list. |
|---|---|
| Ok | The ok key pauses or resumes the scan. When the scan is paused, the flip bar continues to be displayed, while the animated icon stays frozen. The pause of the scan times out in 30 seconds, to exit scan mode. |
| Exit | The exit key exits the scan mode. It removes the TV icon from the flip bar, and displays the plain flip bar for the currently viewed program. The flip bar times out to idle state. |
| Channel up/down | The channel up can be used to "skip" the currently scanned program and move on to the next program in the scanned list. The channel down key can be used to view the previously scanned program. After displaying the previously scanned program, the scan control comes back to the current program. (The scan does not change direction) |
| Favorite key | The favorite key behaves similar to the channel up button. |
| Arrow Keys | The arrow keys do not work in the scan mode (Currently the arrow keys allow the user to navigate the mini guide) |

FIG. 31

SYSTEMS AND METHODS FOR PROVIDING A SCAN

This invention is directed to systems and methods for providing scans in video or audio entertainment systems. This application claims the benefit from U.S. Provisional Patent Application No. 60/686,229, filed May 31, 2005, and U.S. Provisional Patent Application No. 60/678,494, filed May 6, 2005, both of which are incorporated herein by reference in their entireties.

BACKGROUND OF THE INVENTION

Interactive media guidance applications, such as interactive television program guides, are well known in the art. One known guidance feature is a channel scan. Channel scan features generally allow users to initiate a tuning sequence that proceeds from channel to channel without requiring the user to repetitively issue channel change commands. During a channel scan, a guidance application pauses on each channel for a period of time to allow the user to see what is on. Some scans do not tune sequentially, and instead allow users to scan programs that are, for example, only of a certain category.

SUMMARY OF THE INVENTION

In accordance with the principles of the present invention, systems and methods are provided for enhanced scanning functionality in an interactive media guidance application, such as an interactive television program guide. Various embodiments of the present invention provide scanning features for scheduled television programs provided on analog or digital television channels. Embodiments of the present invention may also provide scanning features for non-scheduled video assets provided in other ways, such as video-on-demand (VOD) assets provided in a television system, Internet-delivered videos, or stored content. For simplicity, the different sources of these assets may be referred to as "channels" herein.

In some embodiments, the assets that are included in the scan are included because they meet certain conditions. For example, the scan may include only favorite assets or sources that were designated as favorites by the user. Or, as another example, the scan may include only assets that the interactive media guidance application determines to be potentially desirable to the user based on monitored user behavior. The interactive media guidance application may include a video asset in the scan based on whether other application features have been set for the asset, such as whether the user has purchased the asset, or whether the user has set a reminder for the asset. The interactive media guidance application may skip sources of video assets during a scan when, for example, the assets are temporarily unavailable such as when a television program goes to commercial.

Some embodiments of the present invention provide for an intelligent ordering of assets in the scan based on the availability of video assets. Assets that will become unavailable sooner (e.g., because they are going off the air, or because they will no longer be offered by the content provider), are put at the front of the scan. The interactive media guidance application may, in some approaches, include indicators of the next available asset from a source.

Some embodiments of the present invention include a scan wizard having a video window, an information panel, a scan criteria panel and a scan control panel. The user may select or adjust criteria for the scan, and dynamically control the scan, while the scan is in progress.

In some embodiments of the present invention, the interactive media guidance application may simultaneously perform and display multiple scans. In embodiments having multiple tuners or other source selectors, the interactive media guidance application may present video assets from multiple sources at once in multiple video windows. In embodiments having a single source selector, the interactive media guidance application may simultaneously display multiple programs by displaying still frame images of programs provided by sources that are not activated (e.g., channels that are not tuned to). Alternatively, the interactive media guidance application may simultaneously display multiple programs using a single tuner by tuning to a frequency that is encoded with a digital bitstream representing multiple services (e.g., an MPEG-2 multiple-service transport stream) and displaying two or more of the programs carried on that frequency.

In some embodiments, the interactive media guidance application may allow a user to record a program that is currently displayed in a scan without interrupting the scan. The interactive media guidance application may also allow the user to perform trick-play functions on a program that is displayed in a scan (e.g., a program that has been recorded, is in the process of being recorded, or is available on-demand).

BRIEF DESCRIPTION OF THE DRAWINGS

The above and other features of the present invention, its nature and various advantages will be more apparent upon consideration of the following detailed description, taken in conjunction with the accompanying drawings in which:

FIG. 7A shows an illustrative display screen of a scan wizard in accordance with one embodiment of the present invention;

FIGS. 25-29 show illustrative overlays that may be displayed during a scan in accordance with one embodiment of the present invention;

FIGS. 30A and 30B show an illustrative table of icons in accordance with one embodiment of the present invention; and FIG. 31 shows an illustrative table of scan actions in accordance with one embodiment of the present invention.

DETAILED DESCRIPTION

Although the embodiments described below may refer to scanning channels in broadcast digital or analog television systems, it is to be clearly understood that the systems and methods of the invention may be used with any suitable video or audio content (e.g., on-demand or recorded content) in any suitable media system (e.g., satellite, on-demand, and IPTV system).

As also used herein, the term "tune" or "tuning" refers to the steps of acquiring and displaying a specific content stream or selection accessible by the user equipment. For traditional analog television systems, tuning may include acquiring or locking onto a particular channel carrier frequency. For digital television systems, tuning may include demodulating the digital carrier frequency, forward-error correction (FEC) decoding the demodulated transport stream (TS), demultiplexing the transport stream and filtering and separating out particular packet identifiers (PIDs). For IPTV, tuning may include opening a socket and joining a particular multicast group. For recorded content, tuning includes locating content on a storage device (e.g., by reading a file access table (FAT) for information stored on the storage device).

As used herein, content or channel "scanning" refers to automatically tuning through a series of content selections or channels (e.g., an automatic progression up, down, or in a random, a dynamically, or a statically determined sequence through a number of channels).

Figure 1:
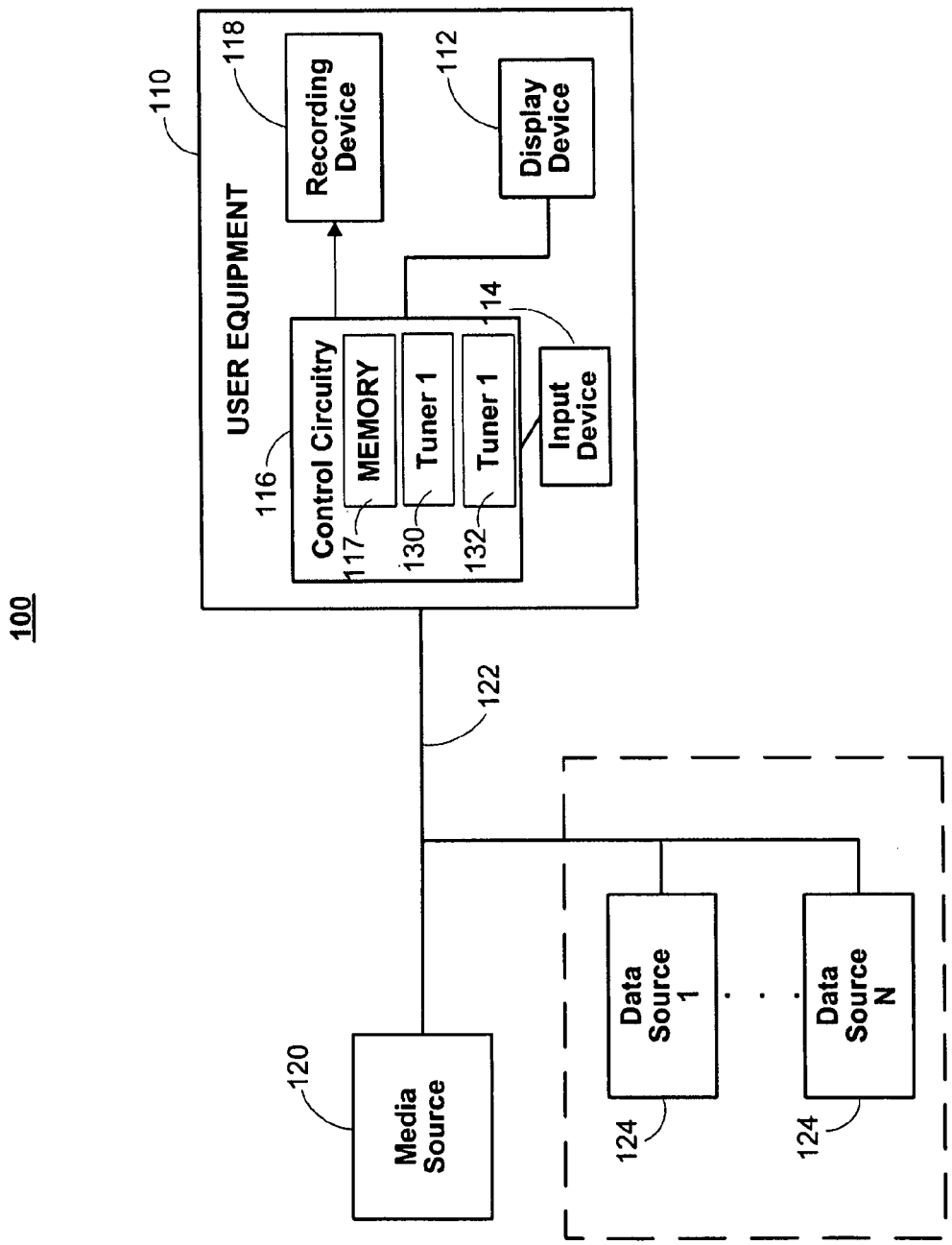
FIG. 1 is a diagram of an illustrative interactive media system in accordance with one embodiment of the present invention.

FIG. 1 shows illustrative interactive media system 100 in accordance with one embodiment of the invention. User equipment 110 receives media in the form of signals from media source 120 over communications path 122. In practice there may be multiple media sources 120 and user equipment 110, as well as multiple communication paths 122, but only one of each has been shown in FIG. 1 to avoid over-complicating the drawing.

Media source 120 may be any suitable media source such as, for example, a cable system headend, satellite media distribution facility, media broadcast facility, internet protocol television (IPTV) headend, on-demand server (e.g., VOD server), website, game service provider (e.g., for online gaming), or any other suitable facility or system for originating or distributing media. Media source 120 may be configured to transmit signals over any suitable communications path 122 including, for example, a radio-frequency broadcast path, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing the instructions of an interactive media guidance application such as, for example an online interactive media guidance application which includes a scan feature.

User equipment 110 may include any equipment suitable for providing an interactive media experience. User equipment 110 may include television equipment such as a television, set-top box, recording device, video player, user input device (e.g., remote control, keyboard, mouse, touch pad, touch screen or voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a fixed electronic device such as, for example, a gaming system (e.g., X-Box, PlayStation, or GameCube) or a portable electronic device, such as a portable DVD player, a portable gaming device, a cellular telephone, a PDA, a music player (e.g., MP3 player), or any other suitable fixed or portable device.

In the example of FIG. 1, user equipment 110 includes at least control circuitry 116, display device 112, user input device 114, and recording device 118 which may be implemented as separate devices or as a single device. A trick-play client may be implemented on user equipment 110 to provide trick-play functions to the user for media displayed on display device 112. In some embodiments, the trick-play client may be part of an interactive media guidance application, such as an interactive television program guide. Trick play refers to actions that emulate VCR controls on a digital recording device, including pause, rewind, fast forward, slow motion, and skip forward/back.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the interactive media guidance application. Display device 112 may also be configured to provide for the output of audio.

Recording device 118 may include a hard drive (e.g., one or more ATA, SCSI, IDE, or IEEE 1394 drives), digital video recorder (DVR), personal video recorder (PVR), or any other device capable of storing media content. Control circuitry 116 may access stored content (e.g., programs and movies) on recording device 118 and cause the content to be presented on display device 112 at any suitable time. Recording device 116 may include one or more tuners. In some embodiments, recording device 118 may be omitted.

Control circuitry 116 is adapted to receive user inputs from input device 114 and execute the instructions of the interactive media guidance application. Control circuitry 116 may include one or more tuners 130 and 132 (e.g., analog or digital tuners), encoders and decoders (e.g., MPEG decoders), processors (e.g., MIPS family processors), memory 117 (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 116 may be included as part of one of the devices of user equipment 110 such as, for example, part of display 112 or any other device (e.g., a set-top box, television and video player).

Tuners 130 and 132 may include one or more analog or digital tuners, network sockets (for IPTV systems), MPEG encoders/decoders, or other suitable audio/video circuitry. Tuners 130 and 132 may also include decoding/encoding circuitry for converting over-the-air or cable analog signals to MPEG signals for storage or for decoding digital audio and video signals. The tuning and encoding/decoding circuitry may be used by user equipment 110 to receive and display, play, or record a particular television, music, or on-demand channel or any other desired audio and video content (e.g., video requested from network-based or local digital video recorders).

Control circuitry 116 may direct tuners to tune, acquire, and decode any suitable content accessible by user equipment 110. For example, user equipment 110 may include tuner 130, a first analog tuner used to acquire analog television signals, and tuner 132, a second digital tuner used to acquire and decode digital television signals. Control circuitry 110 may store or buffer one or more frames of video from tuners 130 and 132 to memory 117 at any suitable time. In addition, memory 117 may include one or more pre-stored buffers (e.g., circular buffers) of low-resolution audio or video, graphics, advertising, or any other suitable content. Control circuitry 110 may cause the stored frames, pre-stored buffer, audio, or video to be displayed or presented on display device 112 at any suitable time (e.g., after some user input from user input device 114).

In some embodiments, user equipment 110 may also include graphics circuitry (e.g., incorporated within control circuitry 116). The graphics circuitry may include video and/or audio transcoding circuitry, one or more graphics processors, memory, and various display outputs (e.g., S-Video and composite video outputs). The graphics circuitry may also include video compression and scaling codecs or circuitry to scale the input from tuners 130 and 132 (or from some other device, such as recording device 118) to a resolution or size other than the input's native resolution or size. For example, using the graphics circuitry, the input to tuners 130 and 132 may be displayed at a smaller size on display device 112 than their native size in order for program listings information to be presented with the tuner content on the same display screen. As another example, the graphics circuitry may present full-motion or still frame thumbnail windows corresponding to one or more tuner inputs on the same display screen. The graphics circuitry may scale one video input at a time or scale more than one video input simultaneously. For example, the inputs of both of the tuners may be scaled simultaneously so that these inputs may be displayed together on the same display screen in real-time (perhaps with program listings information, content suggestions, or other suitable information).

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data sources 124. But for the clarity of the figure, the equipment of only a single user is shown. The equipment of the plurality of users may be connected to media source 120 and data source 124 using a cable television network, a satellite television network, a local area network (LAN), a wireless network, the Internet, or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive television program guide. Another data source 124 may, for example, provide data for another interactive application (e.g., a home shopping application). In some embodiments, data sources 124 may provide data to the interactive media guidance application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

The user may find it desirable to automatically scan through a plurality of channels to select which programs to watch, record, or set as favorites. For a scan to be effective, however, it is desirable to display only programs (e.g., not including commercials) that are related to the user's interests. In addition, it is desirable to modify the scan as the user provides scanning instructions to make the scanning experience as efficient and fruitful as possible for the user. Illustrative process 200 (FIG. 2) describes an illustrative method for providing some of these features.

Figure 2A:
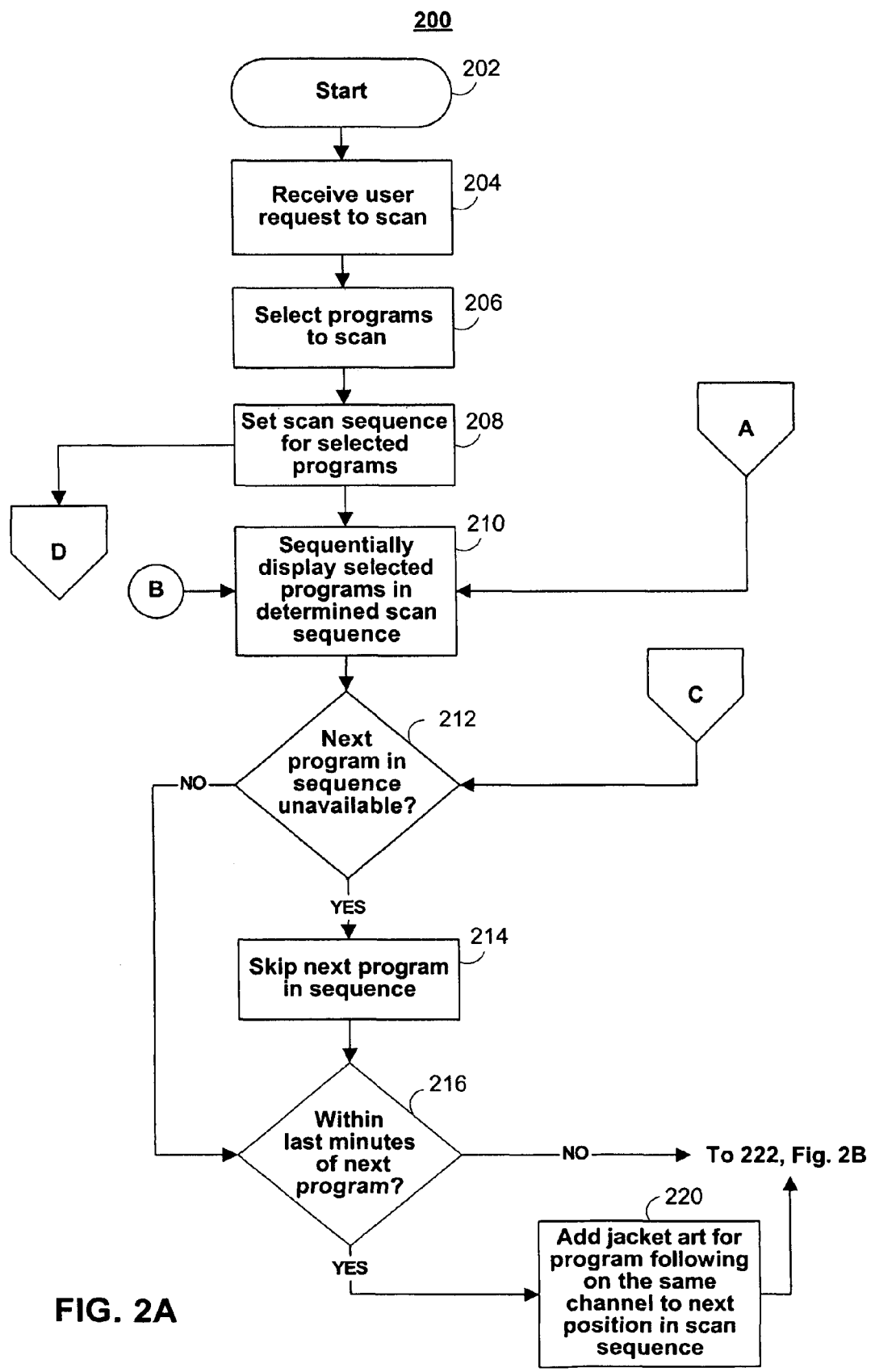
FIGS. 2A and 2B show a flow chart of an illustrative process for modifying a scan based on a user's interactions with the scan in accordance with one embodiment of the present invention.
Figure 2B:
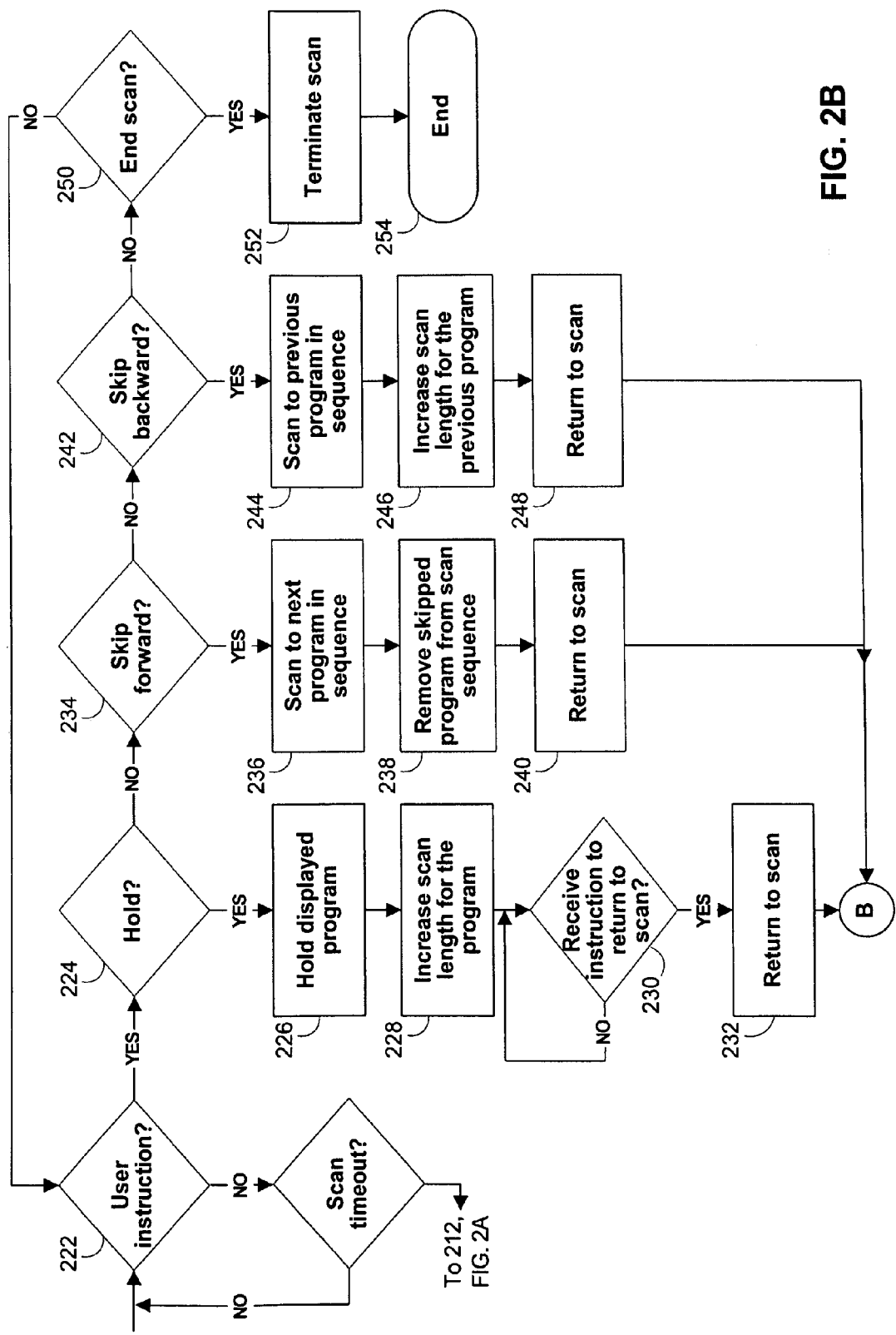

FIGS. 2A and 2B show illustrative process 200 for selecting the programs that are scanned, as well as the scan sequence for the selected programs. Process 200 begins at step 202 (FIG. 2A). At step 204, the interactive media guidance application receives a user request to start a scan. For example, the interactive media guidance application may receive a key or key sequence entered by the user with input device 114 (FIG. 1) associated with a "scan" instruction, or the interactive media guidance application may receive a user selection of an appropriate option from an interactive media guidance application screen. In some embodiments, the user request to start a scan may also include criteria for selecting the programs to scan. At step 206, the interactive media guidance application selects the programs to scan. In some embodiments, the interactive media guidance application may select the programs based on some criteria provided by the user at step 204. For example, the interactive media guidance application may identify the programs currently available from media source 120 (FIG. 1) using the data provided by data source 124 (FIG. 1), and select the programs of media source 120 that includes data that satisfies some criteria (e.g., a theme or actor). The programs that the interactive media guidance application selects may be currently available programs such as, for example, broadcast/satellite programs, on-demand programs, recorded programs, or any other current program. At step 208, the interactive media guidance application sets a scan sequence for the selected programs. For example, the interactive media guidance application, using the data for the selected programs provided by data source 124, may set a scan sequence for the selected programs (e.g., orders the programs by channel number, start-time, end-time, program length, or proximity of program to criteria).

In some embodiments, instead of determining the scan sequence for all of the programs identified at step 206 prior to starting the scan, the interactive media guidance application may select the next program to display in the scan while the current program is displayed. For example, the interactive media guidance application may start a scan, display a first selected program, determine which program to display next and, after the scan length for the displayed program has lapsed, display the next program. The interactive media guidance application may repeat this process as long as the user does not terminate the scan. This process for setting the scan sequence may be used in any of the embodiments of the invention described above or below.

Once the programs have been selected, and the scan sequence has been set, process 200 moves to step 210 and automatically displays the selected programs in the order defined by the scan sequence. Each program is displayed, for example in a display window, for a set time period (e.g., 5 seconds). When the time period lapses, the interactive media guidance application directs a tuner to tune from the channel of the displayed program to the channel of the next program to be displayed in the scan sequence. The interactive media guidance application then directs display device 112 to display the program transmitted on the newly tuned channel.

At step 212, the interactive media guidance application determines whether the next program in the scan sequence is available. For example, the interactive media guidance application may determine whether the next program in the scan sequence is at a commercial. If the next program in the scan sequence is a recorded asset, it may have a "play from this point" marker that presently points to the beginning of a commercial. In this case, the marker may be advanced to beyond the commercial before the scan of that program starts. The interactive media guidance application may detect a commercial based on the absence of the FCC mandated "broadcast flag" during a protected program or other means as would be understood to one skilled in the art. If the interactive media guidance application determines that the next program in the scan sequence is at a commercial, process 200 moves to step 214. At step 214, the interactive media guidance application skips the program that is at a commercial break. As another example, the interactive media guidance application may identify commercials from recorded or on-demand programs, and skip the programs in the scan or advance past the commercials in them prior to displaying the programs. For example, if the interactive media guidance application determines, as it directs a tuner to tune, or prior to directing a tuner to tune, to the channel of the next program, that the broadcast flag is absent, the interactive media guidance application modifies the scan sequence for the current cycle and removes the next program from the sequence. If, at the next cycle, the program is no longer unavailable (e.g., at a commercial break), the interactive media guidance application may re-insert the program in the scan sequence and direct display device 112 to display the program at the appropriate time in the sequence. Process 200 then moves to step 216. Alternatively, after skipping the next program at step 214, process 200 may instead move back to step 212 to determine whether the next program in the scan is available.

Figure 3:
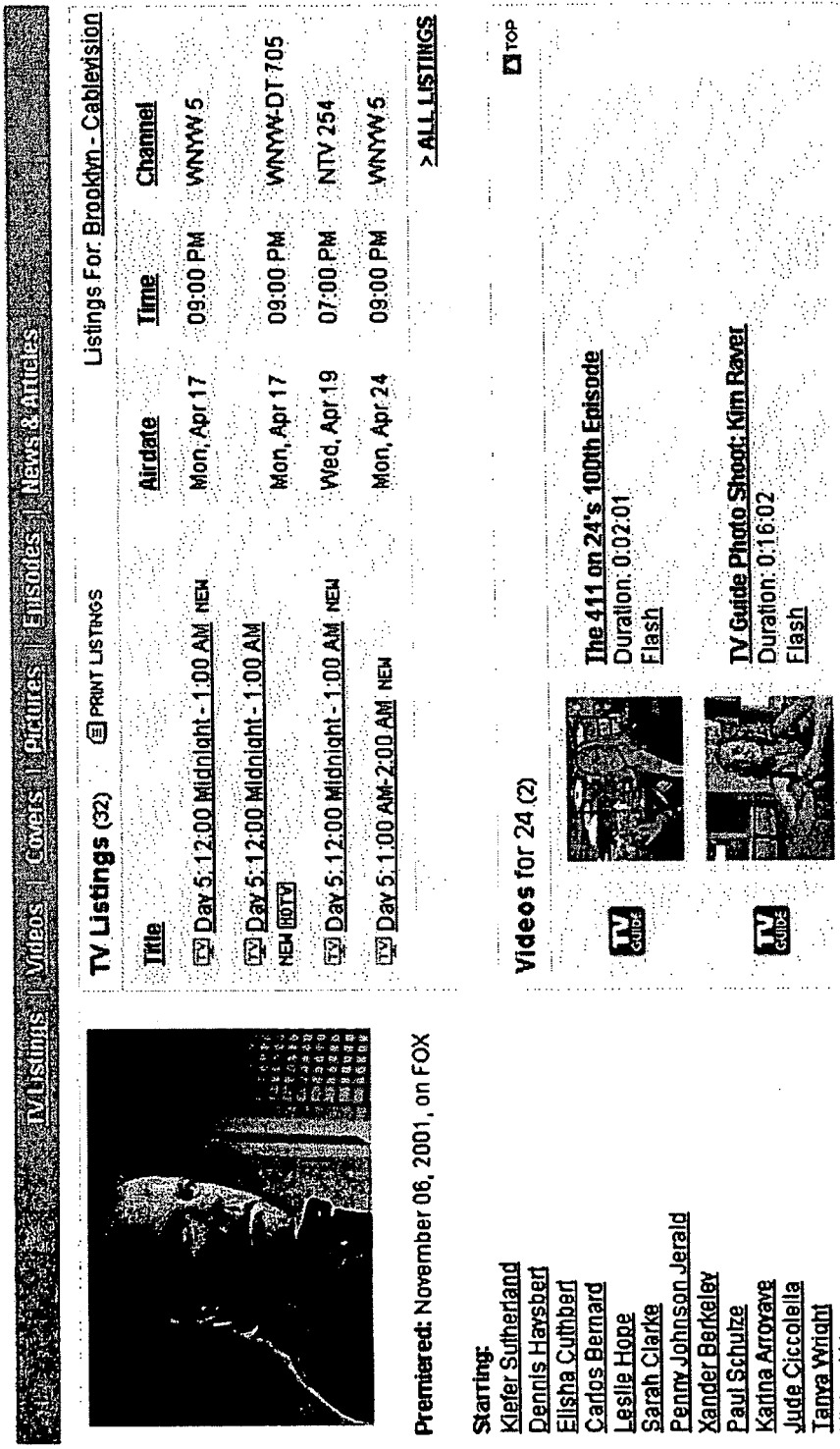
FIG. 3 shows an illustrative screen of an information page displayed in accordance with one embodiment of the present invention.

If, at step 212, the interactive media guidance application instead determined that the next program in the scan sequence is not at a commercial, process 200 moves to step 216. At step 216, the interactive media guidance application determines whether the next program is within the last minutes of the program. For example, the interactive media guidance application identifies the end time of the program based on the program data provided by data source 124 and compares the end time to the current time. If the interactive media guidance application determined that the next program is within the last minutes, process 200 moves to step 220. At step 220, the interactive media guidance application adds jacket art or other preview material for the program following on the same channel as the next program to the scan sequence. For example, the interactive media guidance application may display information provided by data source 124 in a screen following the display of the next program in the scan. In some embodiments, the preview material may replace the program that is ending in the scan sequence. The information may include jacket art, program description, video clips, audio clips, webpage hyperlinks, or any other suitable information related to the program that follows on the same channel. FIG. 3 shows an illustrative information screen 300 for the program "24," which follows the program that is currently being displayed (e.g., "Prison Break"). In some embodiments, the interactive media guidance application may only display information for the program following the next program if that program is related to the scan criteria first provided by the user (e.g., criteria provided at step 204). Process 200 then moves to step 222 (FIG. 2B).

If, at step 216, the interactive media guidance application instead determines that the next program is not within the last minutes of the program, process 200 moves to step 222 (FIG. 2B). At step 222, the interactive media guidance application determines whether the user has provided a "scan" instruction. For example, the interactive media guidance application determines whether the user has provided instructions by pressing a key or key sequence on user input device 114, or whether the user has selected an on-screen option (e.g., hold, skip forward, or skip backward). If the interactive media guidance application determines that the user has not provided a "scan" instruction, process 200 returns to step 222 and continues to monitor for user scan instructions.

While monitoring for user input, the application checks for scan timeout at step 223. Scan timeout occurs when the currently displayed program has been displayed for a pre-determined period of time and it is time to scan to the next program in the scan sequence. If scan timeout does not occur, the application returns to step 222 to check for user input. If scan timeout does occur, process 200 may return to step 212 (FIG. 2A) and check for the availability of the next program in the sequence and display it.

If, at step 222, the interactive media guidance application instead determines that the user has provided a "scan" instruction, process 200 moves to step 224. At step 224, the interactive media guidance application determines whether the instruction was to hold. For example, the interactive media guidance application may determine whether the key or key sequence pressed by the user, or the option that the user selected on an interactive media guidance application screen, corresponds to a "hold" instruction. If the interactive media guidance application determines that the user provided a "hold" instruction, process 200 moves to step 226. At step 226, the interactive media guidance application holds the scan and displays the current program beyond the set scan length (e.g., 5 seconds). At step 228, the interactive media guidance application determines from the hold that the user is interested in the program, and automatically increases the scan length for the program. For example, the interactive media guidance application may increase the scan length to a maximum length (e.g., 15 seconds) before moving on. As another example, the interactive media guidance application may increase the scan length proportionally with the length of the hold (e.g., a 30 second hold in a 30 minute program corresponds to a 5 second increase in the scan length). In some embodiments, the scan length may be increased indeterminately, holding on the program until the user indicates that the scan should be resumed.

At step 230, the interactive media guidance application determines whether the user has provided an instruction to return to the scan. For example, the interactive media guidance application may determine whether the key or key sequence pressed by the user, or the option that the user selected on an interactive media guidance application screen, corresponds to a "return" instruction. For example, releasing the "hold" key could be interpreted as a return to scan function. As another example, the user may press a "hold" key to hold the scan, and press the "hold" key a second time to release the hold (or return to the scan). In some embodiments, if a hold exceeds some threshold (e.g., 30 seconds) the scan application automatically exits the scan mode or prompts the user for an instruction to exit the scan mode. If the interactive media guidance application determines that the user has not provided an instruction to return to the scan, process 200 returns to step 230 and continues to monitor for user instructions.

If, at step 230, the interactive media guidance application instead determines that the user has provided an instruction to return to the scan, or if the increased scan hold time is reached, process 200 moves to step 232 and returns to the scan. Process 200 then moves back to step 210.

If, at step 224, the interactive media guidance application instead determines that the user instruction is not to hold, process 200 moves to step 234. At step 234, the interactive media guidance application determines whether the user instruction is to skip forward. For example, the interactive media guidance application may determine whether the key or key sequence pressed by the user, or the option that the user selected on an interactive media guidance application screen, corresponds to a "skip forward" instruction. If the interactive media guidance application determines that the user provided a "skip forward" instruction, process 200 moves to step 236.

At step 234, the interactive media guidance application skips to the next program in the scan sequence, and displays the next program for the user.

At step 238, the interactive media guidance application removes the skipped program from the scan sequence. For example, the interactive media guidance application may modify the scan sequence to delete the skipped program. Alternatively, the interactive media guidance application may modify the scan length for the skipped program (e.g., decrease the scan length from 5 seconds to 2 seconds). In some embodiments, the interactive media guidance application may decrease the scan length proportionally with the time the program was displayed (e.g., the user hit "skip forward" after 3 seconds of display, the new scan length is set to 3 seconds). In some embodiments, a skipped program may not be removed from the scan sequence and its scan length may not be modified. At step 240, the interactive media guidance application returns to the scan. Process 200 then moves back to step 210.

If, at step 234, the interactive media guidance application instead determines that the user instruction is not to skip forward, process 200 moves to step 242. At step 242, the interactive media guidance application determines whether the user instruction is to skip backward. For example, the interactive media guidance application may determine whether the key or key sequence pressed by the user, or the option that the user selected on an interactive media guidance application screen, corresponds to a "skip backward" instruction. If the interactive media guidance application determines that the user provided a "skip backward" instruction, process 200 moves to step 244. At step 244, the interactive media guidance application scans back to the previous program in the scan sequence, and displays the previous program. For example, the interactive media guidance application may identify the previous program of the scan sequence, direct a tuner to tune to the channel of the program, and direct display device 112 to display the program. At step 246, the interactive media guidance application optionally increases the scan length for the displayed program. For example, the interactive media guidance application may increase the scan length by a given amount (e.g., increase the scan length from 5 seconds to 10 seconds). At step 248, the interactive media guidance application returns to the scan. Process 200 then moves back to step 210.

If, at step 242, the interactive media guidance application instead determines that the user instruction is not to skip backward, process 200 moves to step 250. At step 250, the interactive media guidance application determines whether the user instruction is to end the scan. For example, the interactive media guidance application may determine whether the key or key sequence pressed by the user, or the option that the user selected on an interactive media guidance application screen, corresponds to a "end scan" instruction. If the interactive media guidance application determines that the instruction is not an "end scan" instruction, process 200 moves back to step 222 and continues to monitor for user instructions.

If, at step 250, the interactive media guidance application instead determines that the user instruction is to end the scan, process 200 moves to step 252. At step 252, the interactive media guidance application ends the scan. Process 200 then ends at step 254.

The steps of process 200 may be executed in any suitable alternate order. For example, user commands may be checked in any suitable order, a multiple exit case statement may be executed, a key interrupt may be handled and invoke a subroutine, or whatever appropriate implementation may be used as would be obvious to one skilled in the art. Steps of this process may also be omitted. For example, one of the user commands may not be supported in some embodiments. In some embodiments, steps may be added to this process. For example, additional types of user commands may be supported. This may include, for example, commands to provide information about the currently displayed program, to change display modes, to configure settings, to mark a program, or any other suitable action.

Figure 4:
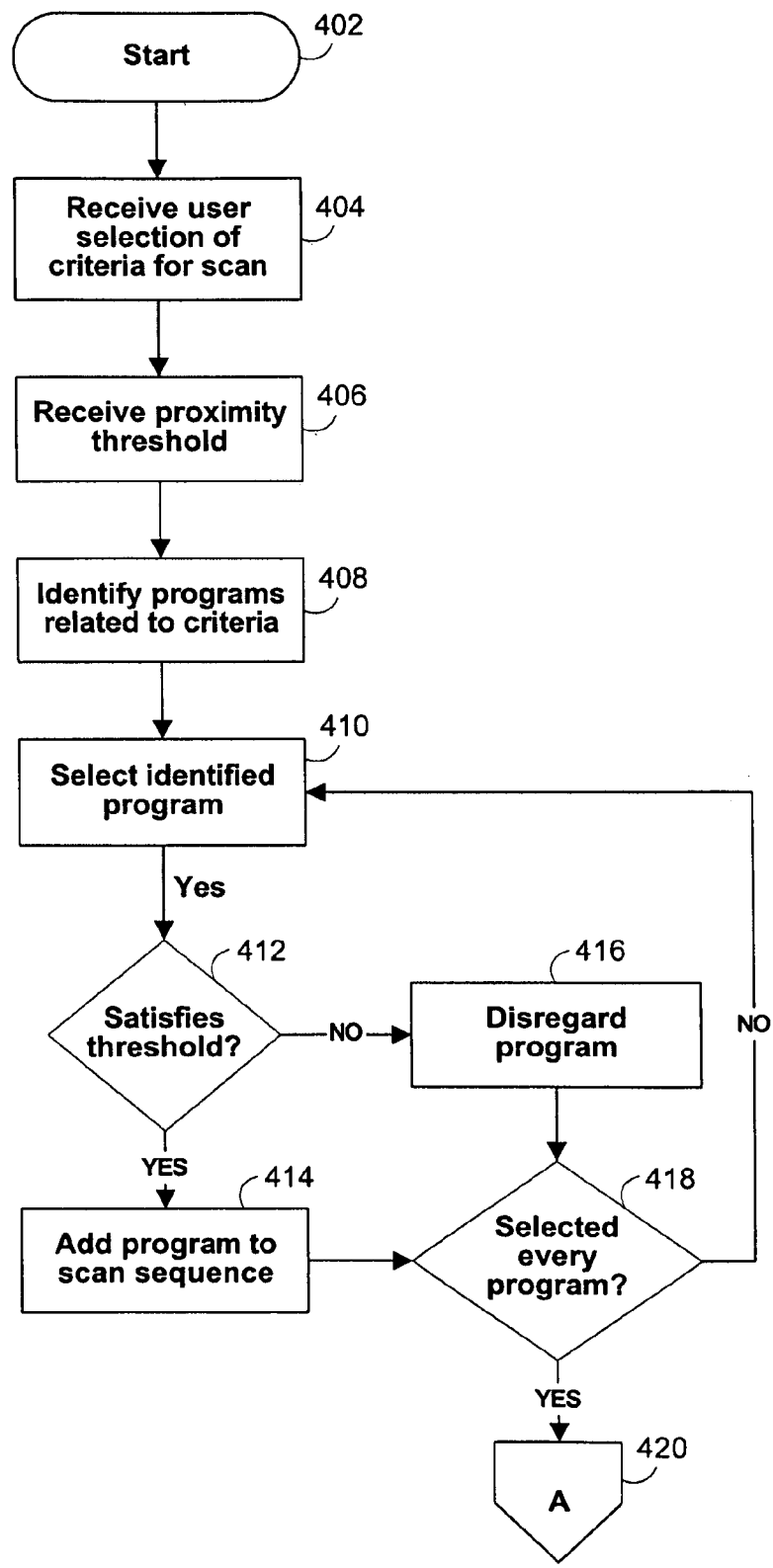
FIG. 4 shows a flow chart of an illustrative process for identifying the programs of the scan sequence in accordance with one embodiment of the present invention.

The user may select which programs to scan using any suitable method. For example, the user may set a criteria and a proximity threshold for the criteria that limits the number of programs related to the criteria that are displayed as part of the scan. As another example, the interactive media guidance application may automatically select criteria and a proximity threshold based on learned user behavior. Process 400, shown in FIG. 4, is an illustrative process for selecting the programs that are scanned.

Process 400 begins at step 402. At step 404, the interactive media guidance application receives a user selection of criteria for scanning. For example, the interactive media guidance application may receive a key or key sequence entered by the user on user input device 114 (FIG. 1), or a selection of an on-screen option, that corresponds to a particular criteria. The criteria may include any suitable criteria for selecting programs such as, for example, a theme, an actor, a rating, a sport, a favorite, a premium service, a musical style, or any other suitable criteria or combination of criteria. As another example, the interactive media guidance application may automatically select the criteria based on the user's behavior. For example, the interactive media guidance application may select criteria based on the user's viewing history, a user profile created by the user, or any other source of information regarding the user's interests.

At step 406, the interactive media guidance application receives a user selection of a proximity threshold for the programs. For example, the interactive media guidance application may receive a key or key sequence entered by the user with user input device 114, or a selection of an on-screen option, that corresponds to a particular proximity threshold. The proximity threshold may be expressed in any suitable manner including, for example a cap on the number of programs (e.g., 10 programs), a percentage measurement of proximity (e.g., 75% similar), or any other suitable manner. In some embodiments, the threshold may be selected automatically by the application, for example, to avoid a scan sequence containing too few or no programs. In some embodiments, there may be no threshold, and all programs matching the selected criteria may be included in the scan.

At step 408, the interactive media guidance application identifies all of the programs that are related to the criteria selected at step 404. For example, the interactive media guidance application may determine, based on program data provided by data source 124 (FIG. 1), whether a currently available program is related to the selected criteria (e.g., has the same theme). In some embodiments, the application may identify only one or some other subset of the related programs prior to starting the scan, and may identify additional matching programs as needed as the scan progresses.

At step 410, the interactive media guidance application selects an identified program. In some embodiments, the program may be selected based on a sort order that may be predetermined or may be selected by the user. At step 412, the interactive media guidance application determines whether the selected program satisfies the proximity threshold. For example, the interactive media guidance application determines, based on the program data for the program, whether the similarity between the selected program and the selected criteria is within a given percentage (e.g., at least 80% similar). If the interactive media guidance application determines that the selected program satisfies the proximity threshold, process 400 moves to step 414. At step 414, the interactive media guidance application adds the selected program to a scan sequence. For example, the interactive media guidance application adds a reference for the program to the scan sequence. Process 400 then moves to step 418.

If, at step 412, the interactive media guidance application instead determines that the selected program does not satisfy the proximity threshold, process 400 moves to step 416. At step 416, the interactive media guidance application disregards the program, and moves to step 418.

At step 418, the interactive media guidance application determines whether it has selected every program identified at step 408. For example, the interactive media guidance application determines whether it has compared the program data for every program to the criteria and to the proximity threshold. If the interactive media guidance application determines that at least one program has not been selected, process 400 returns to step 410 and selects a program that had not yet been selected.

If, at step 418, the interactive media guidance application instead determines that every identified program has been selected, process 400 moves to step 420, which corresponds to step 210 of FIG. 2.

In some embodiments, the interactive media guidance application may add programs that are not related to a criteria identified for the scan, but that include other features. For example, the interactive media guidance application may also include programs for which the user has set a reminder, and programs that the user has purchased (e.g., VOD programs to which the user loses access after 24 hours), or programs that the system operator feels are of key interest or which the system operator has been provided additional advertisement revenue to promote. In addition, the interactive media guidance application may set the scan sequence based on whether a program is about to finish. For example, it may be desirable to avoid displaying a show to a user that is about to end as it is unlikely the user will want to watch the program if there is not much left to the program. In some embodiments, therefore, the scan criteria can be set by the user to include only those shows in the scan that are within 10 minutes of their start or within some time from the start that is some proportion (e.g., 10%) of the overall length of the program. In other embodiments, suppressing the scan of programs that are near the end may be desirable to avoid letting the user see the end of particular types of shows (e.g., detective/mystery shows) to avoid spoiling the show for future viewing. The following flow chart illustrates a process for providing these features.

Figure 5:
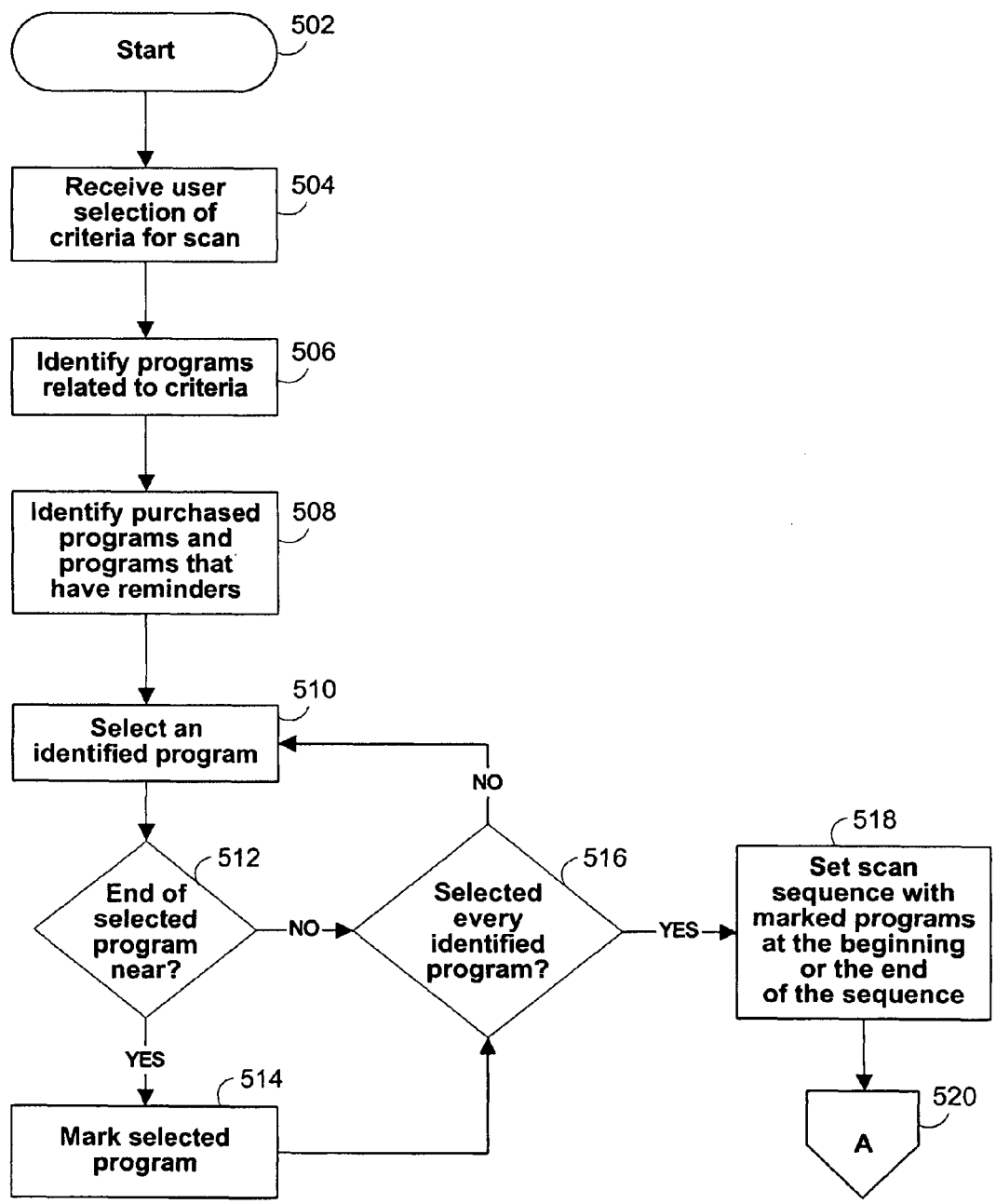
FIG. 5 shows a flow chart of another illustrative process for identifying the programs of the scan sequence in accordance with one embodiment of the present invention.

FIG. 5 shows illustrative process 500 for selecting the programs that are scanned. Process 500 begins at step 502. At step 504, the interactive media guidance application receives a user selection of criteria for scanning. For example, the interactive media guidance application may receive a key or key sequence entered by the user with user input device 114 (FIG. 1), or a selection of an on-screen option, that corresponds to a particular criteria. The criteria may include any suitable criteria for selecting programs such as, for example, a theme, an actor, a rating, a sport, a favorite, a premium service, a musical genre, or any other suitable criteria or combination of criteria. As another example, the interactive media guidance application may automatically select the criteria based on the user's behavior. For example, the interactive media guidance application may select criteria based on the user's viewing history, a user profile created by the user, or any other source of information regarding the user's interests.

At step 506, the interactive media guidance application identifies all of the programs that are related to the criteria selected at step 504. For example, the interactive media guidance application may determine, based on program data provided by data source 124 (FIG. 1), whether a currently available program is related to the selected criteria (e.g., has the same theme). In some embodiments, the application may only identify a single program or a subset of all programs matching the criteria prior to starting the scan and subsequent matching programs may be identified as the scan progresses.

At step 508, the interactive media guidance application identifies purchased programs and programs for which the user has set a reminder and other programs otherwise specifically identified by the user as being of interest. For example, the interactive media guidance application may identify, from interactive media guidance application data and past interactive media guidance application instructions stored in memory 117 (FIG. 1), the programs that the user has purchased, recorded, or for which the user has set a reminder.

At step 510, the interactive media guidance application selects an identified program. The program may be selected from the set of identified programs based on a sort order that may be predetermined or may have been selected by the user. At step 512, the interactive media guidance application determines whether the selected program is about to finish. For example, the interactive media guidance application determines, based on the program data for the program that is provided by data source 124, whether the scheduled end time for the program is near (e.g., within 5 minutes). In some embodiments, this test may be conditioned based on the type of program. For example, the application may test dramas to determine if they are near the end, and may not test news programs. In some embodiments, the number of minutes considered to be near the end may be different based on the type of program. If the interactive media guidance application determines that the selected program is near, process 500 moves to step 514. At step 514, the interactive media guidance application marks the program for future reference. For example, the interactive media guidance application adds an entry in memory 117 for the program. Process 500 then moves to step 516.

If, at step 512, the interactive media guidance application instead determines that the end of the selected program is not near, process 500 moves to step 516. At step 516, the interactive media guidance application determines whether it has selected every program identified at steps 506 and 508. For example, the interactive media guidance application determines whether it has determined, for every program, whether the end of the program is near. If the interactive media guidance application determines that at least one program has not been selected, process 500 returns to step 510 and selects a program that had not yet been selected.

If, at step 516, the interactive media guidance application instead determines that every identified program has been selected, process 500 moves to step 518. At step 518, the interactive media guidance application sets the scan sequence for the identified programs such that the programs that were marked (e.g., programs that will end soon) are at the beginning or the end of the scan sequence. For example, the interactive media guidance application may display programs that are about to end early in the scan to quickly present to the user those relevant programs that may end soon, so that the user does not spend time scanning to other programs and miss the end of a program. This approach may be particularly desirable for programs that do not depend on what was missed (e.g., comedy shows like "Saturday Night Live"). As another example, the interactive media guidance application may display programs that are about to end at the end of the scan so that the user does not waste time scanning through programs that are about to end. This approach may be particularly desirable for programs that depend on the beginning of the program (e.g., murder mystery programs like "CSI: Miami"). In some embodiments, the interactive media guidance application may provide some programs that are about to end at the beginning of the scan, and other programs that are about to end at the end of the scan (e.g., depending on the type of program). In some embodiments, some or all of the programs that are about to end may be removed completely form the scan sequence. Process 500 then moves to step 520, which corresponds to step 210 of FIG. 2.

In some embodiments, a scan may include not only programs that are transmitted or broadcast by media providers, but also on-demand programs, and programs recorded by the user and stored in the user's recording device (e.g., recording device 118). The following process describes a method for identifying programs from a plurality of sources for the scan.

Figure 6:
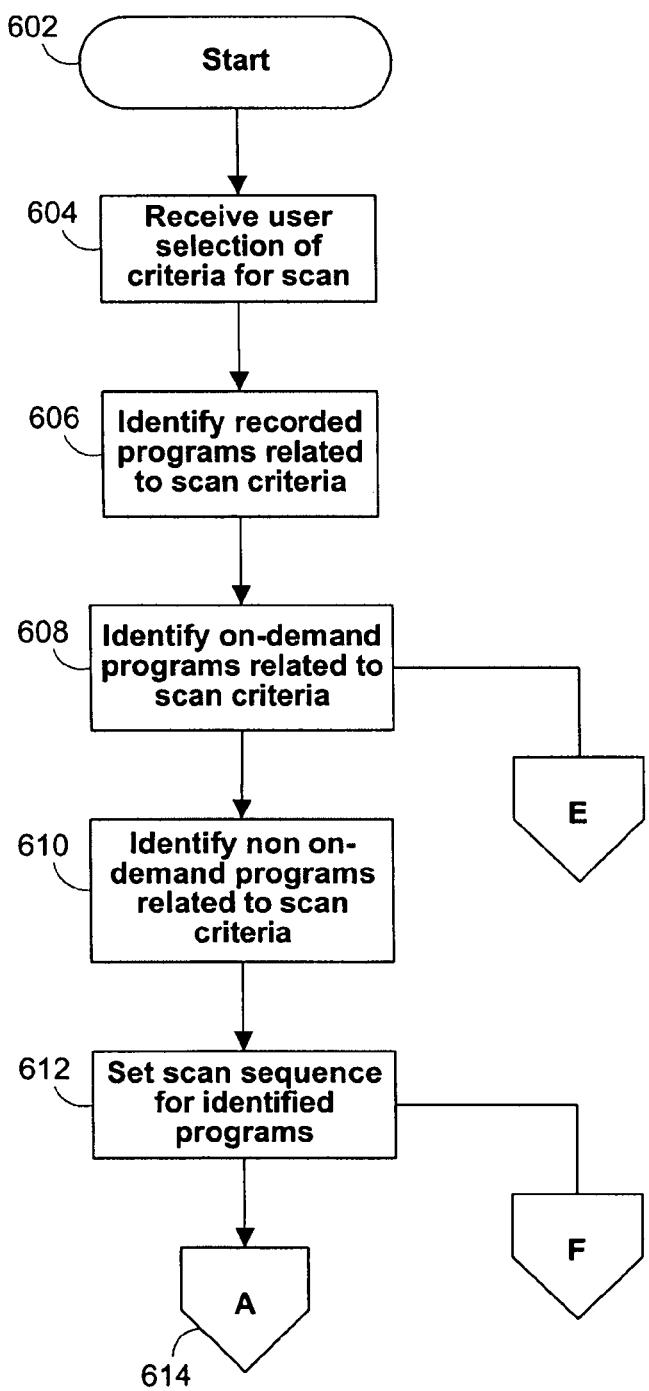
FIG. 6 shows a flow chart of another illustrative process for identifying the programs of the scan sequence in accordance with one embodiment of the present invention.

FIG. 6 shows illustrative process 600 for selecting programs for a scan. Process 600 begins at step 602. At step 604, the interactive media guidance application receives a user selection of criteria for scanning. For example, the interactive media guidance application may receive a key or key sequence entered by the user with user input device 114 (FIG. 1), or a selection of an on-screen option, that corresponds to a particular criteria. The criteria may include any suitable criteria for selecting programs such as, for example, a theme, an actor, a rating, a sport, a favorite, a premium service, a musical genre, or any other suitable criteria or combination of criteria. As another example, the interactive media guidance application may automatically select criteria based on the user's behavior. For example, the interactive media guidance application may select criteria based on the user's viewing history, a user profile created by the user, or any other source of information regarding the user's interests.

At step 606, the interactive media guidance application identifies recorded programs that are related to the scan criteria. For example, the interactive media guidance application may identify the programs stored in recording device 118 (FIG. 1) and identify, from the data associated with those programs, the recorded programs that are related to the selected criteria. In some embodiments, the application may identify all matching recorded programs, while in other embodiments, it may identify one or a subset of matching programs prior to the scan and additional matching programs as the scan progresses.

At step 608, the interactive media guidance application identifies available on-demand programs that are related to the scan criteria. For example, the interactive media guidance application may identify the on-demand programs provided by media source 120 (FIG. 1) or by an on-demand server. In some embodiments, the interactive media guidance application may provide the trailers of for-purchase on-demand programs in the scan. In some embodiments, the interactive media guidance application may provide the actual on-demand programs in the scan. In some embodiments, what is selected for the scan may depend on whether the content is free, previously subscribed by the user, or available only for a fee. In some embodiments, the application may identify all matching on-demand programs, while in other embodiments, it may identify one or a subset of matching programs prior to the scan and additional matching programs as the scan progresses.

At step 610, the interactive media guidance application identifies non-on-demand programs that are related to the criteria selected at step 604 (e.g., the broadcast programs). For example, the interactive media guidance application may determine, based on program data provided by data source 124, whether a transmitted available program is related to the selected criteria (e.g., has the selected theme).

At step 612, the interactive media guidance application sets a scan sequence for all of the identified programs. For example, the interactive media guidance application sets a scan sequence that separates or mingles the programs identified from recorded programs, on-demand programs, and non-on-demand programs. In some embodiments, the interactive media guidance application may separate non-on-demand programs with recorded or on-demand programs in the scan sequence to provide the tuners with additional time to tune to the next non-on-demand program in the sequence (e.g., the scan sequence provides the interactive media guidance application with the scan length of a recorded program to tune from a first channel to a second channel). Process 600 then moves to step 614, which corresponds to step 210 of FIG. 2.

The scan may be provided for the user in any number of formats. For example, the interactive media guidance application may provide a scan wizard for the user. FIG. 7A shows an illustrative scan wizard 700 that the interactive media guidance application may display for the user in response to a scan request. Wizard 700 includes video window 702, information panel 704, criteria panel 706, and scan control panel 708.

When the user starts a scan, the programs that are scanned may be automatically sequentially displayed in video window 702. Information panel 704 may be linked with video window 702 such that when a particular program is displayed in video window 702, information related to that program is also displayed in information panel 704. For example, information panel 704 may include an indication 705 of how relevant the currently displayed program is (e.g., an indication of the proximity measurement calculated at step 412 of process 400, shown in FIG. 4, for the program). Information panel 704 may include any suitable information related to the currently displayed program, such as its title, description, duration, channel number and name, and parental rating. Information panel 704 may instead or in addition include information that is independent of the program displayed in the video window. For example, the interactive media guidance application may display information about the scan criteria, advertisements, program listings, or other programs. In particular, the interactive media guidance application may display information related to programs related to the scan criteria, but that are not currently available (e.g., future broadcast programs).

The user may select the scan criteria using the selectable options of criteria panel 706. Criteria panel 706 includes criteria categories 710, and associated options 712 for each of the categories. The user may navigate through the options by selecting arrows 714 or by pressing an arrow key on a remote control. The categories shown in FIG. 7A include "movies," "sports," "kids," "HDTV," "Favorites," "Premium," "Music," and "Settings," though any other suitable category may be shown. The user may select one or more options in one or more of the categories by highlighting the option 712 using highlight region 716, and selecting the option. In response to a user selection of an option, the interactive media guidance application may mark the option in any suitable manner (e.g., with check mark 718). In the example shown in FIG. 7A, the use has selected the criteria "baseball" in the "sports" category.

Other criteria in the sports category may include basketball, football, volleyball, hockey, figure skating, bass fishing, or any other suitable sport. The "movies" category may include action, adventure, thriller, comedy, horror, sci-fi or any other suitable movie criteria. The "kids" category may include educational, cartoons, pre-teen shows, or any other kids criteria. The "HDTV" category may include movies, sports, all HDTV sources, or any other HDTV criteria. The "Favorites" category may include a plurality of favorite channels and/or programs as defined by a specific user's favorite definitions, or any other favorite criteria. The "Premium" category may include Showtime, HBO, Cinemax, TMC, or any other premium service provider criteria. The "Music" category may include pop, rock, rap, hip hop, classical, contemporary, digital, or any other music criteria. The "Settings" category may include scan length, proximity threshold, or any other criteria related to the settings for a scan.

In addition to selecting scan criteria in criteria panel 706, the user may control the scan by selecting scan control options 720 from control panel 708. The control options shown in FIG. 7A include "skip backward," "skip forward," "hold," "tune," "info," "zoom," and "setting," which the user may select using highlight region 722. When the scan is first accessed, a "start" control may be displayed instead of the "hold" control. Once the scan has begun, the "start" control may be replaced with the "hold" control, which when selected, may be replaced by a "resume" control. In response to a user selecting the "zoom" option, the interactive media guidance application may display full-screen wizard 740, shown in FIG. 7B. Full-screen wizard 740 includes zoomed video window 742, reduced criteria panel 746, and control panel 748. The functionality of these and other control options will be described in more detail in illustrative process 800 of FIG. 8, which is described below.

Figure 7B:
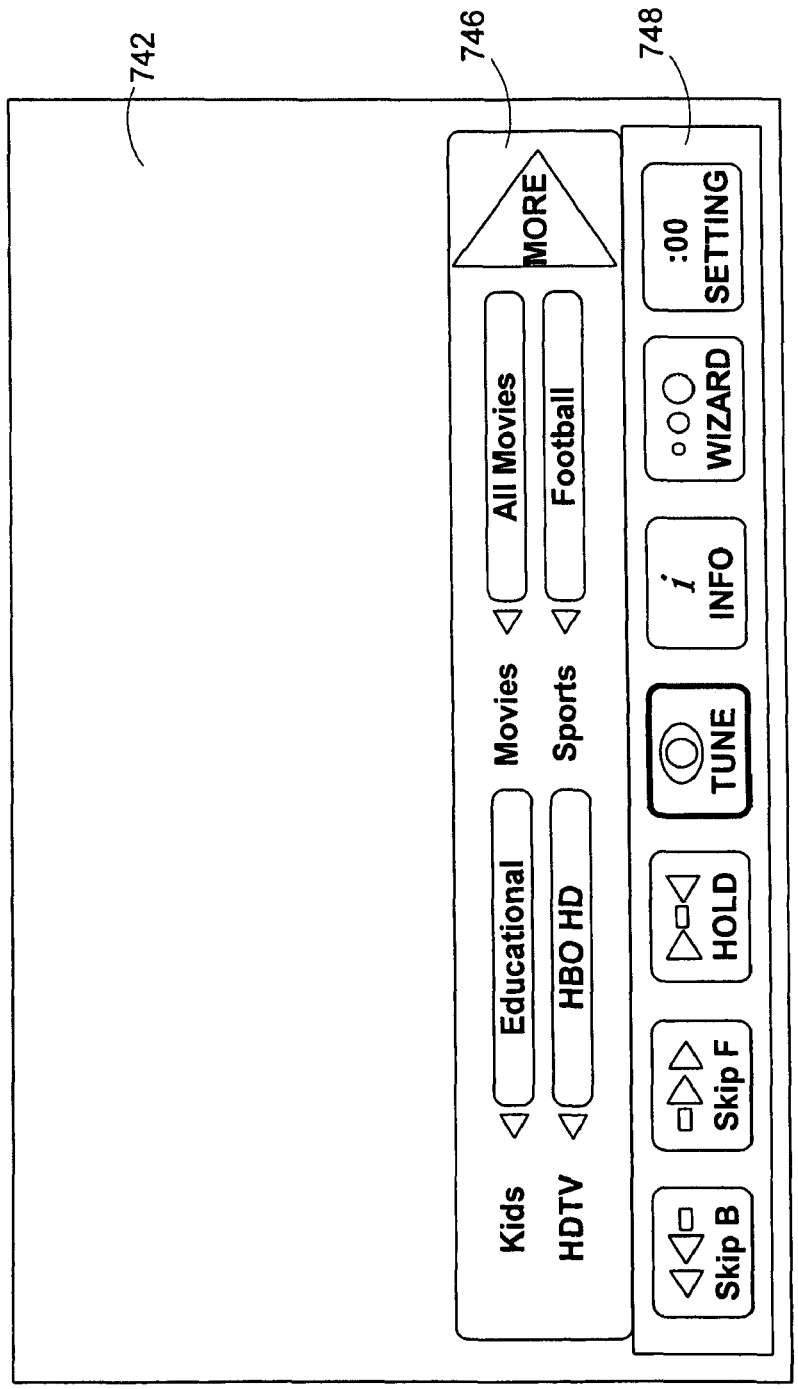
FIG. 7B shows an illustrative display screen of a scan wizard in a full-screen display in accordance with one embodiment of the present invention.
Figure 8A:
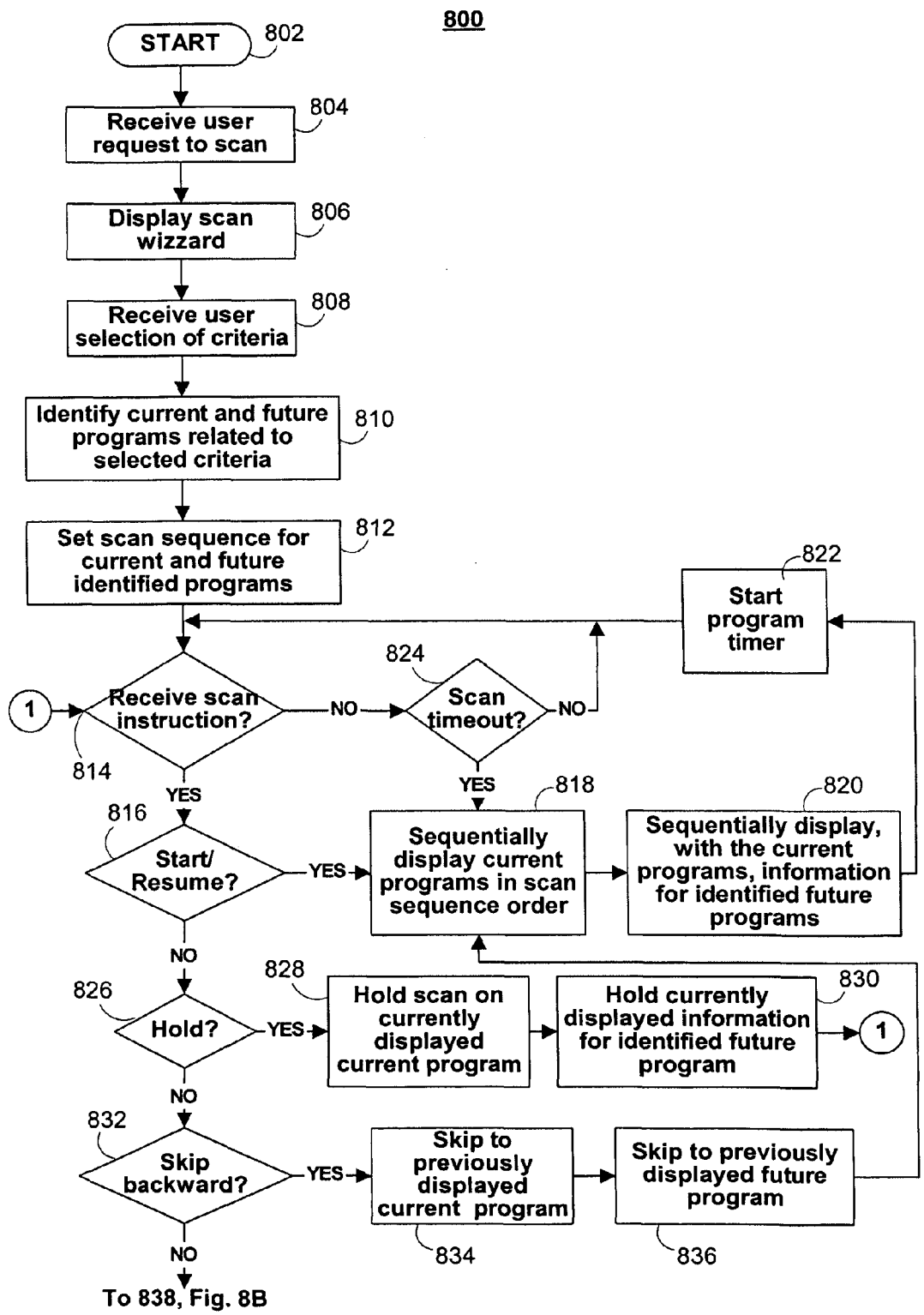
FIGS. 8A and 8B shows a flow chart of an illustrative process for using a scan wizard in accordance with one embodiment of the present invention.
Figure 8B:
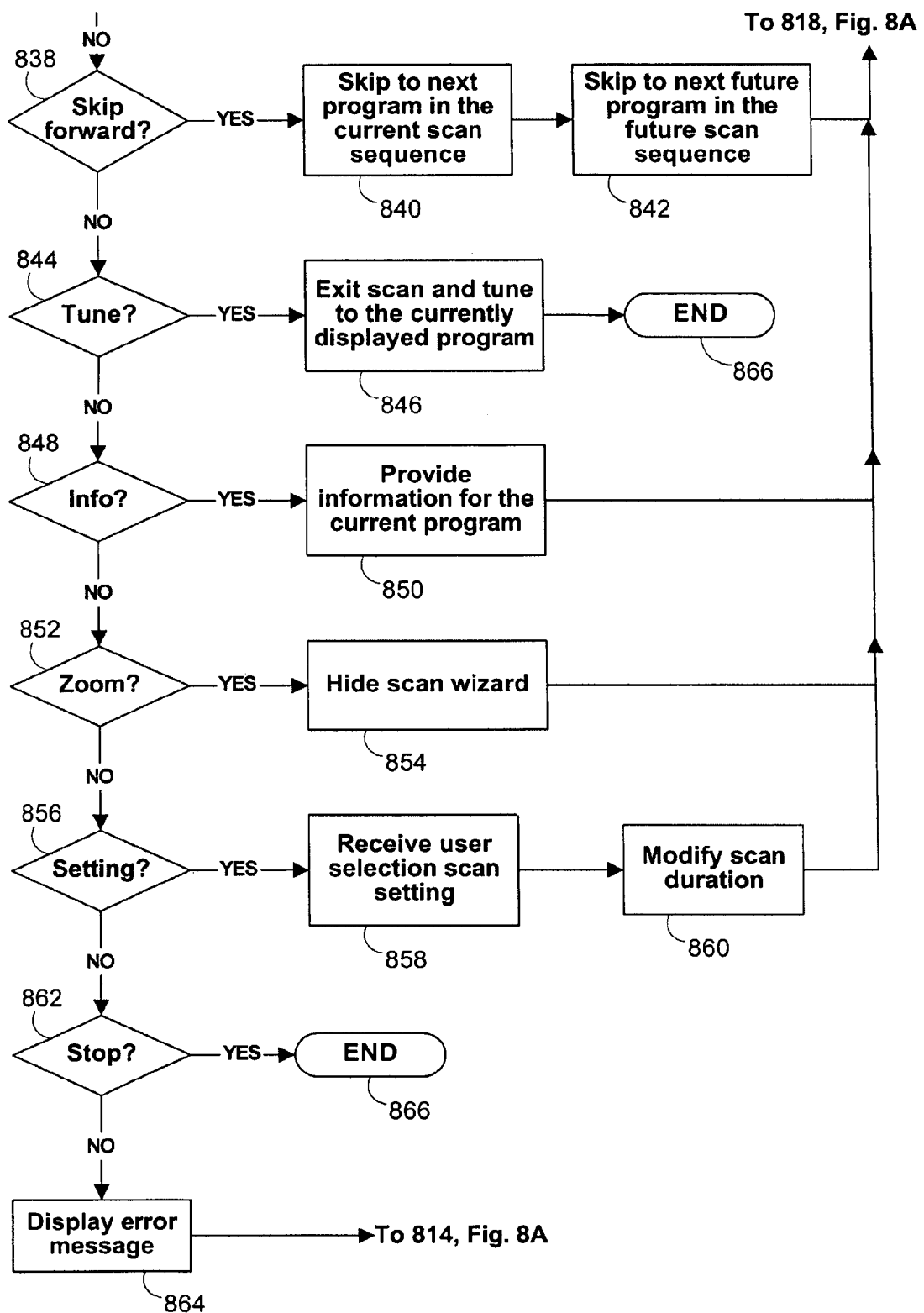

FIG. 8 shows illustrative process 800 for using scan wizard 700 of FIG. 7A. Process 800 begins at step 802. At step 804, the interactive media guidance application receives a user request to scan programs. For example, the interactive media guidance application may receive a key or key sequence from input device 114 (FIG. 1) that is associated with activating the scan wizard.

At step 806, the interactive media guidance application displays the scan wizard. For example, the interactive media guidance application may direct display device 112 (FIG. 1) to display the scan wizard. At step 808, the interactive media guidance application receives a user selection of criteria for the scan. For example, the interactive media guidance application may receive a user selection of one or more scan criteria 712 (FIG. 7A). As another example, the interactive media guidance application may automatically select a criteria based on the user's behavior. For example, the interactive media guidance application may select criteria based on the user's viewing history, a user profile created by the user, or any other source of information regarding the user's interests.

At step 810, the interactive media guidance application identifies current and future programs that are related to the criteria selected at step 806. For example, the interactive media guidance application may compare the program data provided by data source 124 for current and future programs to the criteria selected by the user. If the current and future programs are related to the selected criteria, the interactive media guidance application may identify the programs for scanning. In some embodiments, the application may identify only current programs matching the scan criteria, and may identify matching future program only when they become available. At step 812, the interactive media guidance application sets the scan sequence for the identified current programs and the scan sequence for the identified future programs. For example, the interactive media guidance application may select the order for displaying the programs using any suitable method (e.g., based on start time, end time, time remaining, proximity to scan criteria, or any other suitable method). In some embodiments, the application may determine only the first or a subset of the programs related to the criteria and the scan sequence, determine additional programs as the scan progresses.

At step 814, the interactive media guidance application determines whether the user has provided a "scan" instruction. For example, the interactive media guidance application may determine whether the user has selected a key or key sequence, or selected an on-screen option related to a "scan" instruction.

If, at step 814, the interactive media guidance application determines that the user has provided a "scan" instruction, process 800 moves to step 816. At step 816, the interactive media guidance application determines whether the instruction is to start or to resume the scan. For example, the interactive media guidance application may determine whether the key or key sequence pressed by the user, or the option that the user selected on an interactive media guidance application screen, corresponds to a "start" or "resume" instruction. If the interactive media guidance application determines that the user provided a "start" or "resume" instruction, process 800 moves to step 818. At step 818, the interactive media guidance application sequentially displays the current programs in the order set by the scan sequence. For example, the interactive media guidance application directs a tuner to sequentially tune to the channels of the programs in the scan sequence, and directs display device 112 to display the programs of the channels to which the tuner tunes in video window 702 (FIG. 7A). Step 818 may also include adding matching programs to the scan sequence as they become available, removing programs from the scan sequence as they are no longer available, and otherwise modifying the scan sequence. At step 820, the interactive media guidance application sequentially displays, with the current programs, information related to one or more of the future programs in the order set by the scan sequence for the future programs. For example, the interactive media guidance application retrieves information provided by data source 124 (FIG. 1) related to the future programs, and directs display device 112 to display the information in information panel 704 (FIG. 7A). Process 800 then moves to step 822.

At step 822, the interactive media guidance application starts a scan length timer. The scan length timer counts the time that the current program is displayed. Process 800 then moves back to step 814. If, at step 814, the interactive media guidance application determines that the user has not provided a scan instruction, process 800 moves to step 824. At step 824, the interactive media guidance application determines whether the scan timer has timed out. For example, the interactive media guidance application may compare the time elapsed from the timer set at step 822 to the scan duration (e.g., 5 seconds). If, at step 824, the interactive media guidance application determines that the scan timer has not yet timed out, process 800 moves back to step 814, where it monitors for a user instruction. For example, if no scan has been started, the scan timer cannot have timed out, so process 800 moves back to step 814.

If, at step 824, process 800 instead determines that the scan timer has timed out, process 800 moves back to step 818 and displays the next program in the scan sequence.

If, at step 816, the interactive media guidance application instead determines that the instruction is not to start or to resume the scan, process 800 moves to step 826. At step 826, the interactive media guidance application determines whether the instruction is to hold the scan. For example, the interactive media guidance application may determine whether the key or key sequence pressed by the user, or the option that the user selected on an interactive media guidance application screen, corresponds to a "hold" instruction. If the interactive media guidance application determines that the user provided a "hold" instruction, process 800 moves to step 828. At step 828, the interactive media guidance application holds the scan by maintaining the currently displayed program. For example, the interactive media guidance application directs a tuner to remain tuned to the current channel, and directs display device 112 to display the program of the current channel in video window 702 (FIG. 7A). As another example, the interactive media guidance application may disable the program timer set at step 822. At step 830, the interactive media guidance application hold the display of the information related to future programs. For example, the interactive media guidance application directs display device 112 to continue to display the information related to the currently displayed future program in information panel 704 (FIG. 7A). Process 800 then moves back to step 814, where the interactive media guidance application monitors the user's instructions.

If, at step 826, the interactive media guidance application instead determines that the instruction is not to hold the scan, process 800 moves to step 832. At step 832, the interactive media guidance application determines whether the instruction is to skip backward in the scan. For example, the interactive media guidance application may determine whether the key or key sequence pressed by the user, or the option that the user selected on an interactive media guidance application screen, corresponds to a "skip backward" instruction. If the interactive media guidance application determines that the user provided a "skip backward" instruction, process 800 moves to step 834. At step 834, the interactive media guidance application skips to the previously displayed program in the scan. For example, the interactive media guidance application directs a tuner to tune to the previous channel in the scan sequence, and directs display device 112 to display the program of the previous channel in video window 702 (FIG. 7A). At step 836, the interactive media guidance application skips back to the information for the previous future program in the future scan sequence. For example, the interactive media guidance application directs display device 112 to recover the information previously displayed in information panel 704 (FIG. 7A) and to continue to display the information related to the previous future program. Process 800 then moves back to step 818, where the interactive media guidance application sequentially displays the current programs and information for the future programs, starting with the previous program in the sequence.

If, at step 832, the interactive media guidance application instead determines that the instruction is not to skip backward in the scan, process 800 moves to step 838. At step 838, the interactive media guidance application determines whether the instruction is to skip forward in the scan. For example, the interactive media guidance application may determine whether the key or key sequence pressed by the user, or the option that the user selected on an interactive media guidance application screen, corresponds to a "skip forward" instruction. If the interactive media guidance application determines that the user provided a "skip forward" instruction, process 800 moves to step 840. At step 840, the interactive media guidance application skips to the next identified current program in the scan sequence. For example, the interactive media guidance application directs a tuner to tune to the next channel in the scan sequence, and directs display device 112 to display the program of the next channel in video window 702 (FIG. 7A). At step 842, the interactive media guidance application skips forward to the information for the next future program in the future scan sequence. For example, the interactive media guidance application identifies the information related to the next program in the future scan sequence, and directs display device 112 to displayed the information in information panel 704 (FIG. 7A). Process 800 then moves back to step 818, where the interactive media guidance application sequentially displays the current programs and information for the future programs, starting with the next program in the sequence.

If, at step 838, the interactive media guidance application instead determines that the instruction is not to skip forward in the scan, process 800 moves to step 844. At step 844, the interactive media guidance application determines whether the instruction is to tune to the currently displayed program. For example, the interactive media guidance application may determine whether the key or key sequence pressed by the user, or the option that the user selected on an interactive media guidance application screen, corresponds to a "tune" instruction. If the interactive media guidance application determines that the user provided a "tune" instruction, process 800 moves to step 846. At step 846, the interactive media guidance application exits the scan mode and tunes to the currently displayed program. For example, the interactive media guidance application directs the display device to remove the scan wizard display and to display the program of the currently tuned channel in full screen. If the current program in the scan sequence is a future program, the application may tune to the channel of the upcoming program. Process 800 then moves to step 866, where the scan process ends.

If, at step 844, the interactive media guidance application instead determines that the instruction is not to tune to the program currently displayed in the scan, process 800 moves to step 848. At step 848, the interactive media guidance application determines whether the instruction is a request for information related to the currently displayed program. For example, the interactive media guidance application may determine whether the key or key sequence pressed by the user, or the option that the user selected on an interactive media guidance application screen, corresponds to an "info" instruction. If the interactive media guidance application determines that the user provided an "info" instruction, process 800 moves to step 850. At step 850, the interactive media guidance application displays additional information related to the currently shown program. For example, the interactive media guidance application may display information provided by data source 124 that is related to the program currently displayed in video window 702 (FIG. 7A) in information panel 704 (FIG. 7A) or in an overlay or full screen. In some embodiments, the interactive media guidance application may also hold the scan in response to the user requesting additional information about the currently displayed program. Process 800 then moves to step 814, where the interactive media guidance application monitors the user's instructions.

If, at step 848, the interactive media guidance application instead determines that the instruction is not a request for information related to the program currently displayed in the scan, process 800 moves to step 852. At step 852, the interactive media guidance application determines whether the instruction is to zoom on the currently displayed program. For example, the interactive media guidance application may determine whether the key or key sequence pressed by the user, or the option that the user selected on an interactive media guidance application screen, corresponds to a "zoom" instruction. If the interactive media guidance application determines that the user provided a "zoom" instruction, process 800 moves to step 854. At step 854, the interactive media guidance application hides the scan wizard and scans through the programs in full screen. For example, the interactive media guidance application may direct display device 112 to display only the current program and to hide the scan wizard interface. In some embodiments, the application may display a reduced-sized control panel such as full-screen wizard display 740 (FIG. 7B). Process 800 then moves to step 814, where the interactive media guidance application monitors the user's instructions.

If, at step 852, the interactive media guidance application instead determines that the instruction is not to zoom on the program currently displayed in the scan, process 800 moves to step 856. At step 856, the interactive media guidance application determines whether the instruction is to modify the settings of the scan. For example, the interactive media guidance application may determine whether the key or key sequence pressed by the user, or the option that the user selected on an interactive media guidance application screen, corresponds to a "settings" instruction. If the interactive media guidance application determines that the user provided an instruction to modify the settings, process 800 moves to step 858. At step 858, the interactive media guidance application receives a user selection of a user setting. For example, the interactive media guidance application may receive a key or key sequence corresponding to a scan length. At step 860, the interactive media guidance application applies the setting change (e.g., modifies the scan length) in accordance with the user instruction provided at step 858. For example, the interactive media guidance application directs the tuner to wait until the new scan length has lapsed before tuning to the next channel of the scan sequence. Process 800 then moves to step 814, where the interactive media guidance application monitors the user's instructions. In some embodiments, the user may modify any other scan setting in response to providing a "settings" instruction, such as a minimum proximity threshold.

If, at step 856, the interactive media guidance application instead determines that the instruction is not to modify the settings of the scan, process 800 moves to step 862. At step 862, the interactive media guidance application determines whether the instruction is to stop the scan. If the interactive media guidance application determines that the instruction is not to stop, process 800 moves to step 864. At step 864, the interactive media guidance application displays an error message. For example, the interactive media guidance application may direct display device 112 to display an error message that indicates that the user's entry does not correspond to any known scan instruction. Process 800 then moves to step 814, where the interactive media guidance application monitors the user's instructions. Alternatively, process 800 may terminate after displaying the error message.

If, at step 862, the interactive media guidance application instead determines that the instruction is to stop, process 800 moves to step 866 and ends.

In some embodiments, the scan wizard may include other selectable options. For example, the scan wizard may include a "Delete" button. A user may select the "Delete" button to indicate that the user is no longer interested in the currently displayed program. In response to receiving a selection of this button, the interactive media guidance application may remove the currently shown program from the currently selected scan. The interactive media guidance application may then immediately skip to the next program in the scan sequence and will skip the program in all subsequent cycles through the sequence.

The scan wizard may also include a "More Like This" button. In response to receiving a user selection of this button, the interactive media guidance application may perform an automatic search for other programs that include criteria that is similar to the currently displayed program, and may modify the scan to include only those identified programs.

The scan wizard may also include an "Add program" button. This button may allow the user to add an individual program to an existing scan. In response to selecting this button, the interactive media guidance application may allow the user to identify an individual program to add to the scan (e.g., by searching through a program grid, performing a title search, or entering a channel number). This button may enable users to customize the scan criteria by adding a "wild card" program into the programs that qualify for a scan.

Figure 9:
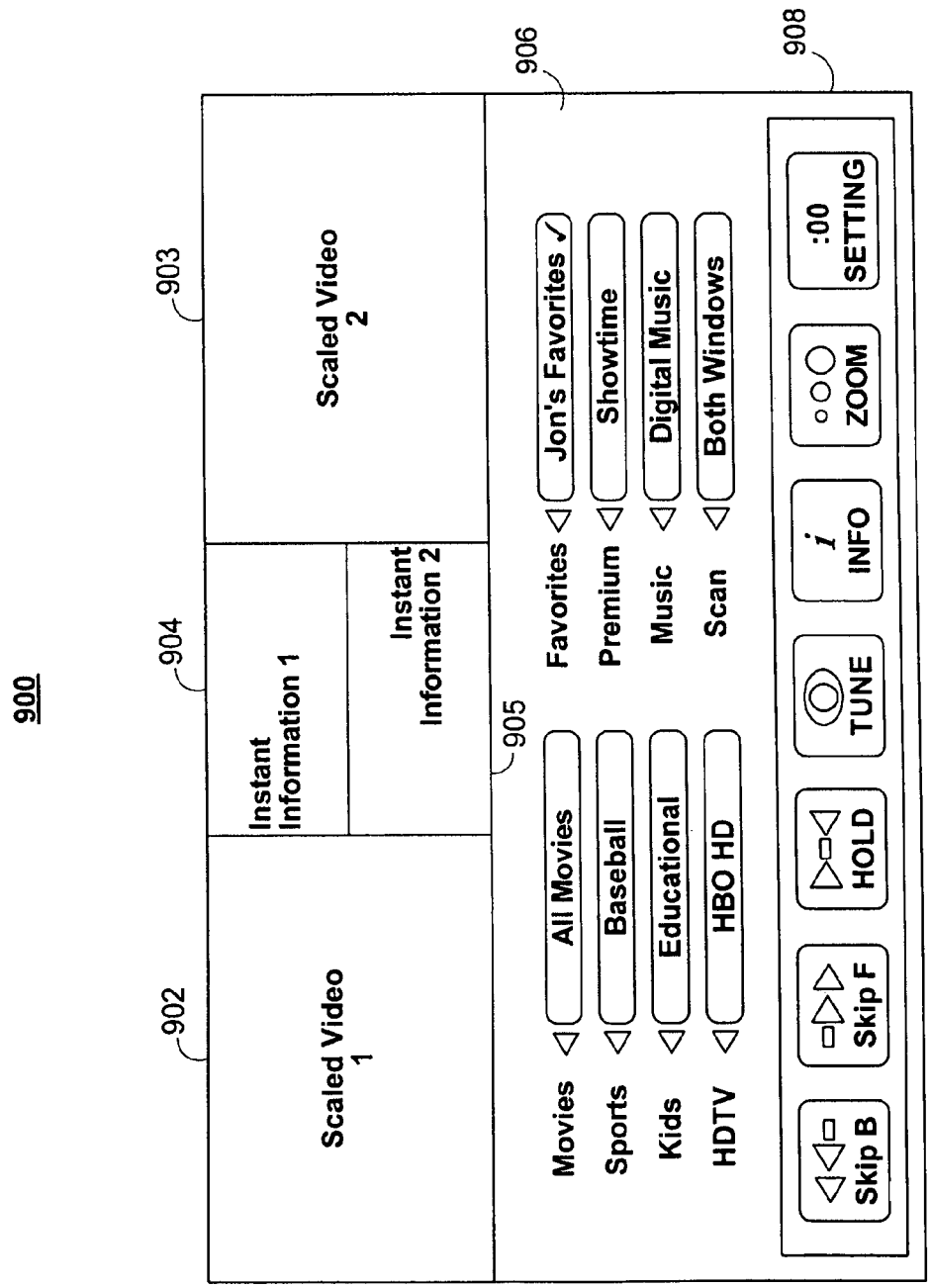
FIG. 9 shows an illustrative display screen for displaying a scan in a plurality of windows in accordance with one embodiment of the present invention.

In some embodiments, the scan wizard may include a plurality of video windows. For example, illustrative scan interface 900, shown in FIG. 9, includes two video windows, video window 902 and video window 903. Each video window may also include an associated information panel, for example information panel 904 and information panel 905. The scan interface may include any number of video windows.

To select criteria for each scan, the user may first select one of the video windows, and subsequently select criteria from criteria panel 906. Alternatively, the scan wizard may include a criteria panel 906 for each of the video windows. Similarly, the user may first select one of the scan windows to select scan functions from scan control panel 908 for the selected scan. Alternatively, the scan wizard may include a scan control panel 908 for each of the scan windows.

Figure 10:
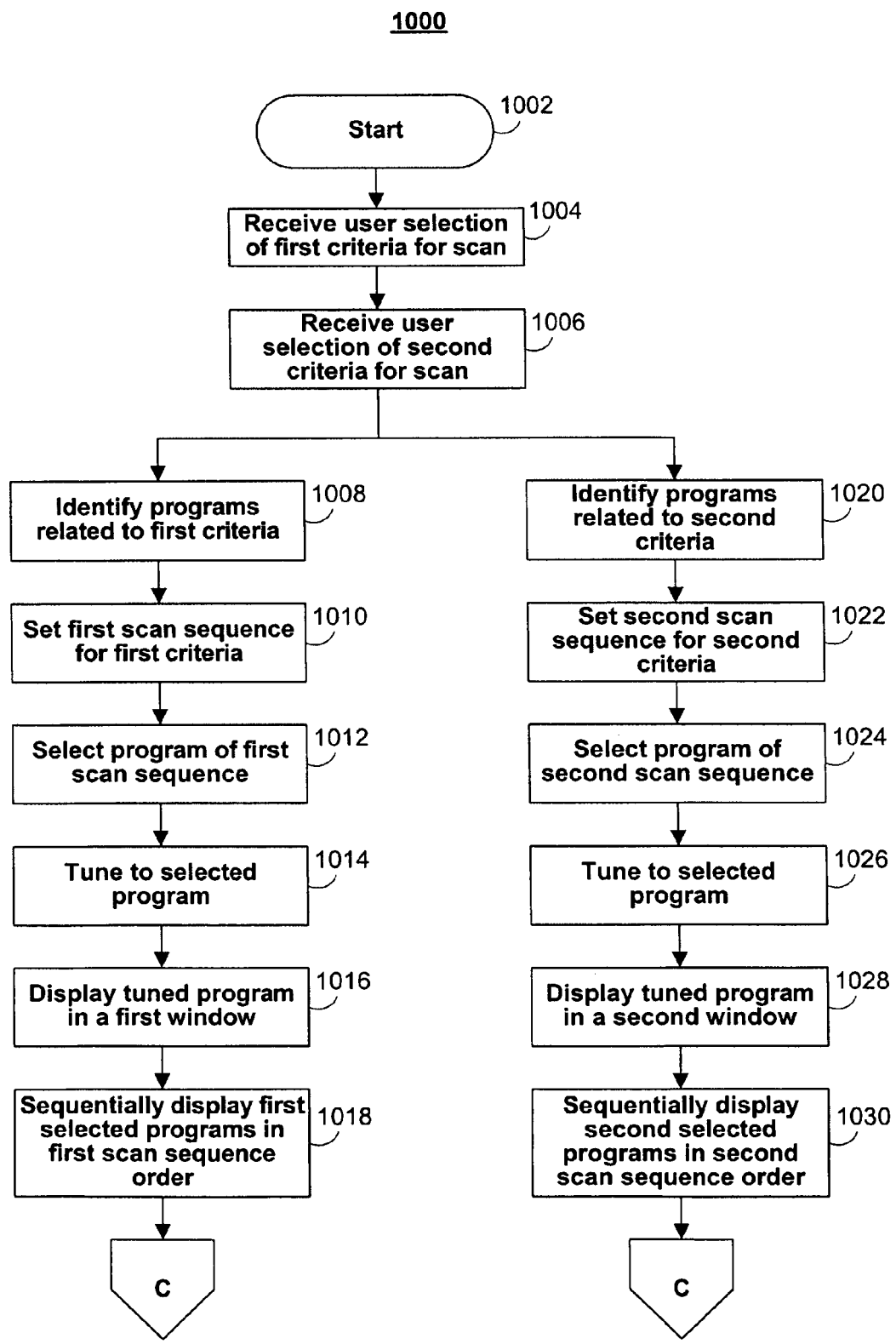
FIG. 10 shows a flow chart of an illustrative process for scanning through programs using multiple tuners in accordance with one embodiment of the present invention.

In some embodiments, the user may simultaneously perform and display multiple scans each related to multiple criteria. For example, the interactive media guidance application may dedicate one tuner of a multi-tuner system to each of the requested scans. The programs being scanned may then be simultaneously be displayed on multiple video windows (e.g., video windows 902 and 903). Illustrative process 1000, shown in FIG. 10, may be used to simultaneously perform and display multiple scans.

Illustrative process 1000 describes the method for simultaneously performing and displaying two scans. It will be understood, however, that any number of scans may be simultaneously performed and displayed using extensions of this method. Illustrative process 1000 begins at step 1002. At step 1004, the interactive media guidance application receives a user selection of first criteria for the first scan. For example, the interactive media guidance application may receive a user selection from the scan wizard of criteria for the first scan. As another example, the interactive media guidance application may automatically select a criteria based on the user's behavior. At step 1006, the interactive media guidance application receives a user selection of second criteria for the second scan. For example, the interactive media guidance application may receive a user selection from the scan wizard of criteria for the second scan. As another example, the interactive media guidance application may automatically select a criteria based on the user's behavior. Process 1000 then moves in parallel to both steps 1008 and 1020.

At steps 1008 and 1020, the interactive media guidance application identifies programs related to the first and second criteria, respectively. For example, the interactive media guidance application may identify the programs currently available from media source 120 (FIG. 1) using the data provided by data source 124 (FIG. 1), and select the programs of media source 120 whose data satisfies the first or second criteria (e.g., a theme or actor), respectively. The programs that the interactive media guidance application selects may be currently available programs such as, for example, broadcast/satellite programs, on-demand programs, recorded programs, or any other current program. The programs may also be future programs. At steps 1010 and 1022, the interactive media guidance application sets a first scan sequence for the first selected programs, and a second scan sequence for the second selected programs, respectively. For example, the interactive media guidance application, using the data for the selected programs provided by data source 124, sets a scan sequence for the selected programs (e.g., orders the programs by start-time, end-time, program length, or proximity of program to criteria).

At steps 1012 and 1024, the interactive media guidance application selects a program from each of the first and second scan sequences, respectively. For example, the interactive media guidance application may select the first program from each of the scan sequences. At steps 1014 and 1026, the interactive media guidance application may tune to each of the first and second selected programs, respectively. For example, the interactive media guidance application may direct tuner 320 (FIG. 1) to tune to the first selected program, and tuner 322 (FIG. 1) to tune to the second selected program. At steps 1016 and 1028, the interactive media guidance application may display the first and second tuned programs simultaneously. For example, the interactive media guidance application may direct display device 112 (FIG. 1) to simultaneously display the programs tuned to by the first and second tuners in video windows 902 and 903 (FIG. 9), respectively. At steps 1018 and 1030, the interactive media guidance application sequentially displays the selected first and second programs in the order set by the first and second scan sequences, respectively. For example, the interactive media guidance application sequentially tunes to and directs display device 112 to display the first and second programs identified at steps 1008 and 1020, respectively. Process 1000 then moves to step 212 of process 200 (FIG. 2).

In some embodiments, the first and second criteria may be the same, and the interactive media guidance application may simply simultaneously display different programs (e.g., consecutive programs in the scan sequence) in a plurality of video windows. In some of these embodiments, a check is performed to make sure that the same program is not displayed in each window. In some embodiments, the interactive media guidance application may use only a single tuner, and display still frame images of other programs in the scan sequence in the non-active video windows while performing the scan. Illustrative process 1100 (FIG. 11) shows a method for displaying still frame images.

Figure 11:
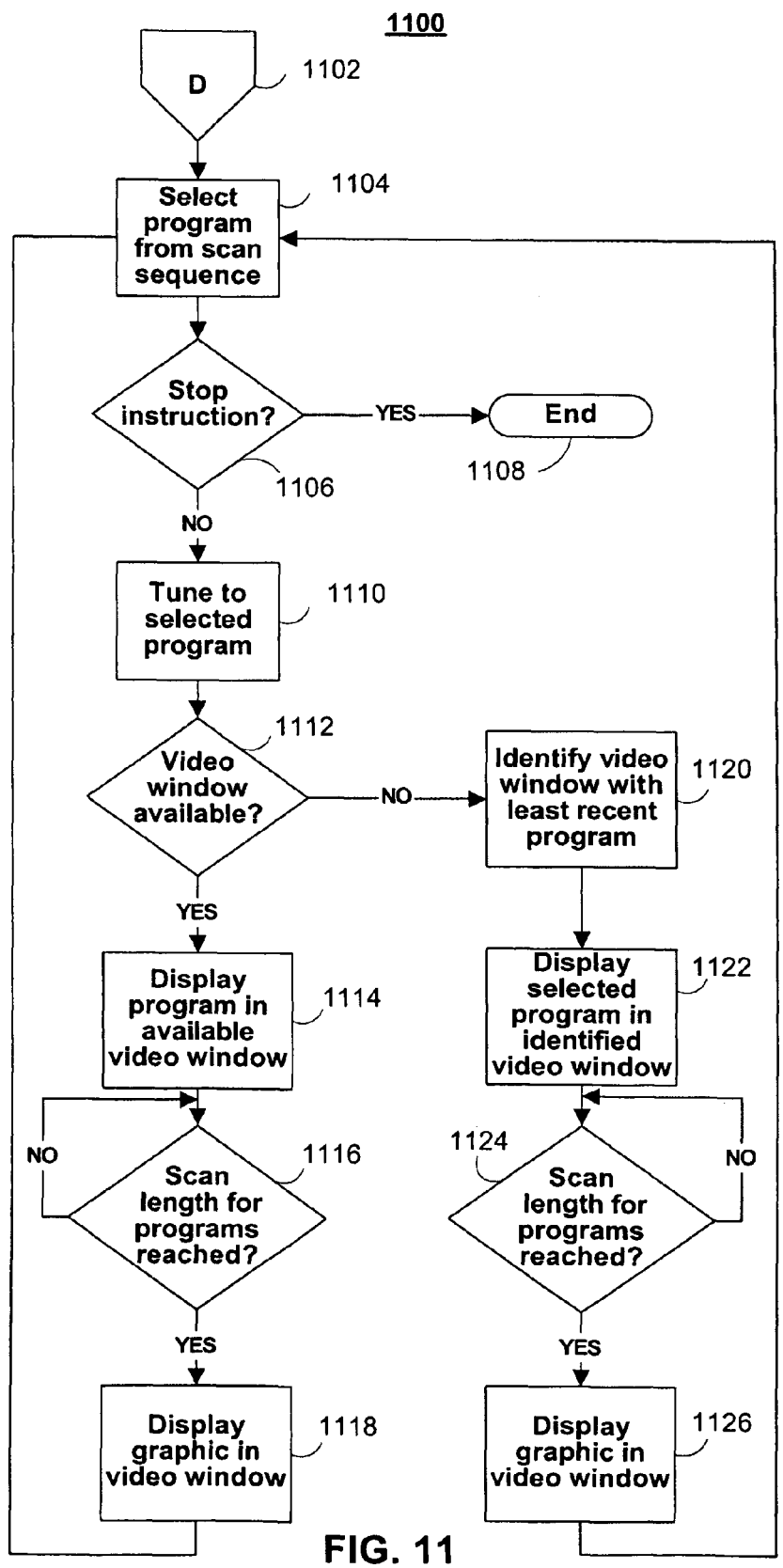
FIG. 11 shows a flow chart of an illustrative process for displaying a scan in a plurality of windows in accordance with one embodiment of the present invention.

FIG. 11 shows illustrative process 1100 for scanning and displaying still frame images of programs in the scan. Process 1100 begins at step 1102, which corresponds to step 208 of process 200 (FIG. 2). At step 1104, the interactive media guidance application selects a program from the scan sequence. For example, the interactive media guidance application selects the first program of the scan sequence at the start of the scan. At step 1106, the interactive media guidance application determines whether the user has provided a "stop" instruction. For example, the interactive media guidance application may determine whether the user has pressed a key or key sequence associated with a "stop" instruction using input device 114 (FIG. 1). If the interactive media guidance application determines that the user has provided a "stop" instruction, process 1100 moves to step 1108 and ends.

If, at step 1106, the interactive media guidance application instead determines that the user has not provided a "stop" instruction, process 1100 moves to step 1110. At step 1110, the interactive media guidance application tunes to the selected program. For example, the interactive media guidance application directs a tuner to tune to the channel of the program. As another example, the interactive media guidance application may tune to an on-demand stream of the program provided by an on-demand server. As still another example, the interactive media guidance application may retrieve a recorded program from recording device 118 (FIG. 1).

At step 1112, the interactive media guidance application determines whether a video window is available. For example, the interactive media guidance application determines whether one of video windows 902 and 903 (FIG. 9) is available. If the interactive media guidance application determines that a video window is available, process 1100 moves to step 1114. At step 1114, the interactive media guidance application displays the program in the available video window. For example, the interactive media guidance application directs display device 112 (FIG. 1) to display the program of the channel to which the tuner is tuned in the available video window. At step 1116, the interactive media guidance application determines whether the scan length for the program has been reached. For example, the interactive media guidance application compares the time that the program has been displayed in the video window with the scan length (e.g., 5 seconds). If the interactive media guidance application determines that the scan length has not been reached, process 1100 returns to step 1116 and continues to monitor the time that the program has been displayed in the video window.

If, at step 1116, the interactive media guidance application instead determines that the scan length has been reached, process 1100 moves to step 1118. At step 1118, the interactive media guidance application displays a graphic in the video window. For example, the interactive media guidance application may select a still frame from the video of the program and direct display device 112 to display the image in the video window. The interactive media guidance application may select any suitable frame of the program such as, for example, the last frame displayed when the scan length is reached, the first frame displayed, an intermediate frame, a promotional image of the program (e.g., provided by data source 124, FIG. 1), or any other still frame image. As another example, the graphic may include a video loop extracted from the program, a video loop representative of the program (e.g., a promotional video such as a trailer), box art representative of the program, or an advertisement still or video loop associated with the program. Process 1100 then returns to step 1104 and selects another program from the scan sequence.

If, at step 1112, the interactive media guidance application instead determines that every video window is being used, process 1100 moves to step 1120. At step 1120, the interactive media guidance application identifies the video window that has the least recent program of the scan sequence. For example, the interactive media guidance application may identify the video window that has the longest displayed still frame image (e.g., the video window of the earliest program in the scan sequence). At step 1122, the interactive media guidance application replaces the image displayed in the identified video window with the currently selected program (e.g., the program selected at step 1104). For example, the interactive media guidance application may direct display device 112 to replace the current image or video displayed in the identified video window with the program of the channel to which the tuner is tuned.

At step 1124, the interactive media guidance application determines whether the scan length for the program has been reached. For example, the interactive media guidance application compares the time that the program has been displayed in the video window with the scan length (e.g., 5 seconds). If the interactive media guidance application determines that the scan length has not been reached, process 1100 returns to step 1124 and continues to monitor the time that the program has been displayed in the video window.

If, at step 1124, the interactive media guidance application instead determines that the scan length has been reached, process 1100 moves to step 1126 where an appropriate still from the video sequence is selected for display. At step 1118, the interactive media guidance application displays a graphic in the video window. For example, the interactive media guidance application may select a still frame from the video of the program and direct display device 112 to display the image in the video window. The interactive media guidance application may select any suitable frame of the program such as, for example, the last frame displayed when the scan length is reached, the first frame displayed, an intermediate frame, a promotional image of the program (e.g., provided by data source 124, FIG. 1), or any other still frame image. As another example, the graphic may include a video loop extracted from the program, a video loop representative of the program (e.g., a promotional video such as a trailer), box art representative of the program, or an advertisement still or video loop associated with the program. Process 1100 then returns to step 1104 and selects another program from the scan sequence.

In some embodiments, the media source (e.g., media source 120) may provide a plurality of programs in a single QAM (quadrature amplitude multiplex) stream. In these embodiments, to access a program that is transmitted in a QAM stream, the interactive media guidance application may direct a tuner to tune to the QAM stream, direct a decoder to extract the appropriate program, decode that program and direct the display device (e.g., display device 112) to display the decoded program. In some embodiments, rather than simply displaying the single program, the interactive media guidance application may extract all of the programs related to the scan criteria that are transmitted in the QAM stream, and simultaneously display all of the related extracted programs. The interactive media guidance application may thus simultaneously display a plurality of non-on-demand programs while using only a single tuner assuming it has the capability to simultaneously decode multiple programs. When multiple videos are displayed, a mechanism to allow the user to select among the audios for the videos may also be provided. In some embodiments, the user may highlight one video and cause the audio of the highlighted video to be played. In some embodiments, the interactive media guidance application may automatically cycle through the videos, highlighting each in turn and playing the synchronized audio associated with that video when it is highlighted. Illustrative process 1200 (FIG. 12) illustrates a method for providing this feature.

Figure 12A:
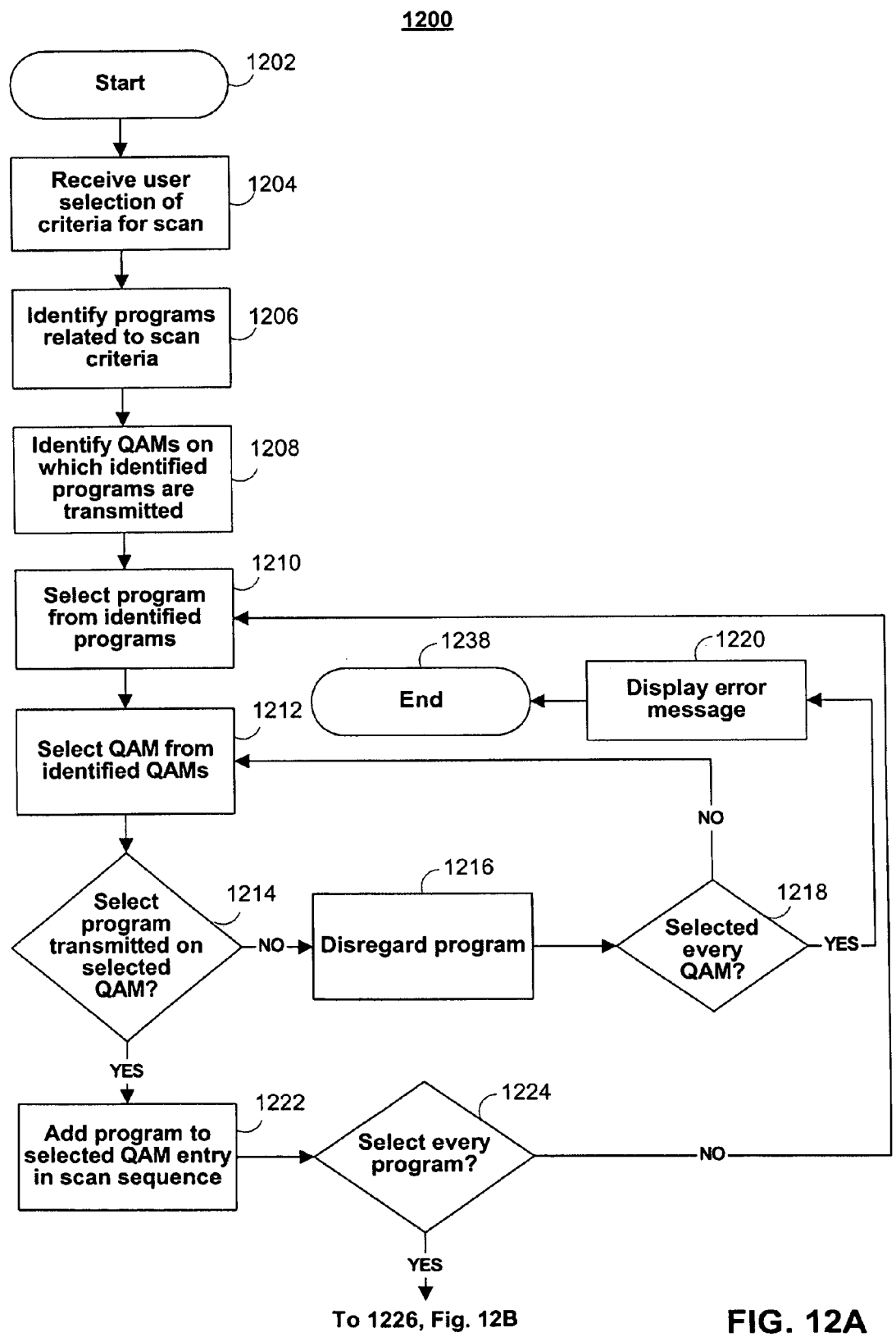
FIGS. 12A and 12B shows a flow chart of another illustrative process for displaying a scan in a plurality of windows in accordance with one embodiment of the present invention.
Figure 12B:
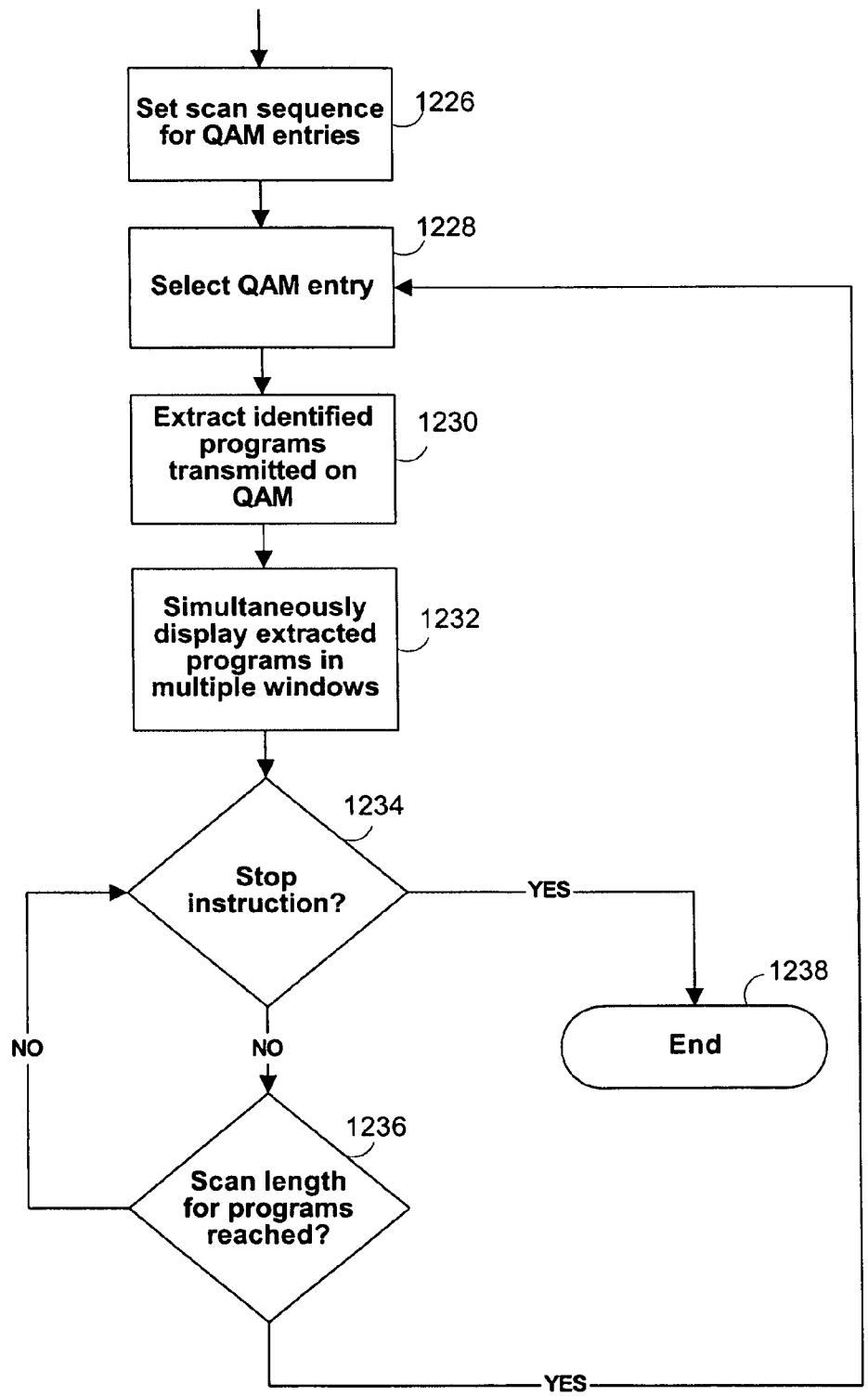

FIG. 12 shows illustrative process 1200 for simultaneously displaying multiple programs in a scan while using a single tuner. Process 1200 begins at step 1202. At step 1204, the interactive media guidance application receives a user selection of criteria for the scan. For example, the interactive media guidance application may receive a user selection from the scan wizard of criteria for the scan. At step 1206, the interactive media guidance application identifies programs related to the selected criteria. For example, the interactive media guidance application may identify the programs currently available from media source 120 (FIG. 1) using the data provided by data source 124 (FIG. 1), and select the programs of media source 120 whose data satisfies the criteria (e.g., a theme or actor). The programs that the interactive media guidance application selects may be currently available programs such as, for example, broadcast/satellite programs, on-demand programs, recorded programs, or any other current program.

At step 1208, the interactive media guidance application identifies the QAMs on which the programs are transmitted.

For example, the interactive media guidance application may determine, from media source 120 or data source 124, The programs that are transmitted in the various QAMs. The interactive media guidance application may then identify those QAMs that include programs that were identified at step 1206 as being related to the scan criteria. At step 1210, the interactive media guidance application selects an identified program. For example, the interactive media guidance application selects one of the programs identified at step 1206. At step 1212, the interactive media guidance application selects an identified QAM. For example, the interactive media guidance application selects one of the QAMs identified at step 1208.

At step 1214, the interactive media guidance application determines whether the selected program is transmitted on the selected QAM. For example, the interactive media guidance application may compare the programs transmitted in the selected QAM with the program selected at step 1210. If the interactive media guidance application determines that the selected program is not transmitted on the selected QAM, process 1200 moves to step 1216. At step 1216, the interactive media guidance application disregards the program. At step 1218, the interactive media guidance application determines whether it has selected every QAM. For example, the interactive media guidance application may compare the QAMs that have been selected at step 1212 with the QAMs identified at step 1208. If the interactive media guidance application determines that every QAM has not yet been selected, process 1200 moves back to step 1212, where the interactive media guidance application selects another QAM.

If, at step 1218, the interactive media guidance application determines that every QAM has been selected, process 1200 moves to step 1220. At step 1220, the interactive media guidance application displays an error message, and terminates at step 1238.

If, at step 1214, the interactive media guidance application determines that the selected program is transmitted on the selected QAM, process 1200 moves to step 1222. At step 1222, the interactive media guidance application adds the selected program to the entry in the scan sequence that is associated with the selected QAM. For example, the interactive media guidance application may, in the scan sequence entry of the QAM, indicate that the program is provided in the QAM. At step 1224, the interactive media guidance application determines whether every program has been selected. For example, the interactive media guidance application may compare the programs that have been selected at step 1210 with the programs identified at step 1206. If the interactive media guidance application determines that every program has not yet been selected, process 1200 returns to step 1210 to select a new program.

If, at step 1224, the interactive media guidance application determines that every program has been selected, process 1200 moves to step 1226. At step 1226, the interactive media guidance application sets a scan sequence for the identified QAMs. For example, the interactive media guidance application, using the data for the selected programs provided by data source 124, sets a scan sequence for the QAMS identified at step 1208 (e.g., orders the QAMs by start-time, end-time, program length of the programs in the QAM, number of matching programs in the QAMs, or proximity of programs in the QAM to the criteria). At step 1228, the interactive media guidance application selects a QAM entry from the scan sequence of QAM entries. At step 1230, the interactive media guidance application extracts the identified programs transmitted on the selected QAM. For example, the interactive media guidance application may identify the programs associated with the QAM entry at step 1222, and direct a decoder to extract and decode the programs for display on display device 112 (FIG. 1). At step 1232, the interactive media guidance application simultaneously displays the programs extracted from the QAM in a plurality of video windows. For example, the interactive media guidance application directs display device 112 to simultaneously display, in a plurality of video windows such as video windows 902 and 903 (FIG. 9), the programs that were extracted and decoded at step 1232. If the number of matching programs in a QAM exceeds some threshold or resource constraint (e.g., of a settop box), such as for example the number of MPEG decoders or the number of concurrent video display windows that can be ergonomically displayed at the same time by the device, the programs in that QAM may be divided into two or more groups to be displayed separately.

At step 1234, the interactive media guidance application determines whether the user has provided a "stop" instruction. For example, the interactive media guidance application determines whether the user has pressed a key or key sequence on input device 114 that is associated with a "stop" instruction. If the interactive media guidance application determines that the user has not provided a "stop" instruction, process 1200 moves to step 1236. At step 1236, the interactive media guidance application determines whether the scan length for the programs has been reached. For example, the interactive media guidance application compares the time that the program has been displayed in the video window with the scan length (e.g., 5 seconds). If the interactive media guidance application determines that the scan length has not been reached, process 1200 returns to step 1234 and determines whether the user has provided a "stop" instruction. If the scan length has been reached, the process returns to step 1228 to select another QAM for display.

If, at step 1234, the interactive media guidance application instead determines that the user has provided a "stop" instruction, process 1200 moves to step 1236 and ends.

Process 1200 may also be used in connection with on-demand or recorded programs. For example, the interactive media guidance application may simultaneously tune to a plurality of recorded programs or on-demand programs (e.g., provided in an IPTV system) and display the plurality of programs. In some embodiments, some windows of the scan may reflect programs carried on different QAM streams, and other windows may represent recordings. The number of simultaneously displayed programs in the scan may then exceed the number of tuners in device and/or the product of the number of QAM streams that can be simultaneously acquired (e.g., limited by the number of tuners) and the number of scan-worthy programs on those QAM streams.

In some embodiments, the interactive media guidance application may scan through recorded and on-demand programs such that no portion of the program is missed due to the scan. Illustrative process 1300 (FIG. 13) shows a method for providing this feature.

Figure 13:
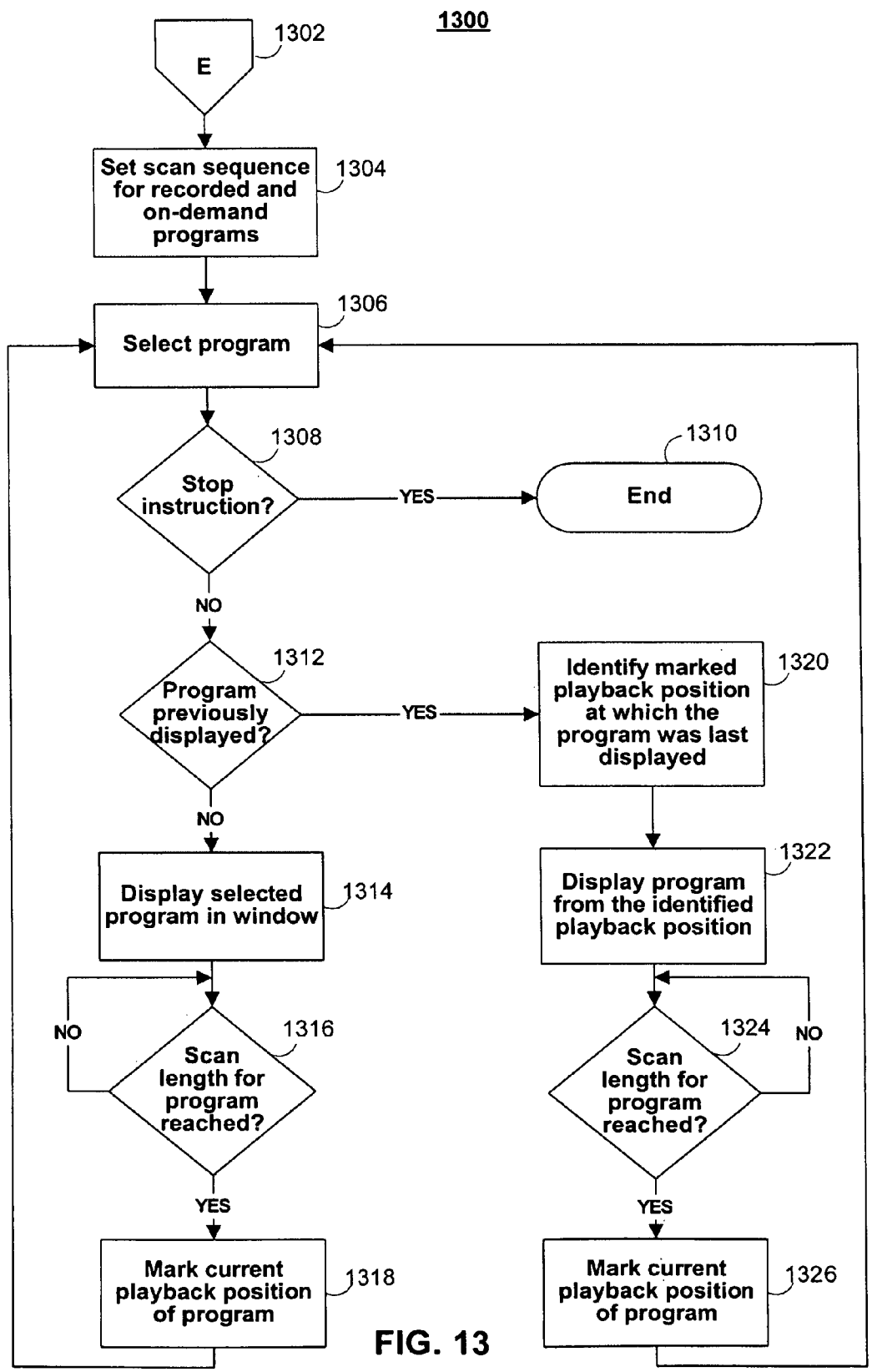
FIG. 13 shows a flow chart of an illustrative process for scanning recorded and on-demand programs in accordance with one embodiment of the present invention.

FIG. 13 shows illustrative process 1300 for scanning programs without missing any portion of the program. Process 1300 begins at step 1302, which is step 608 of process 600 (FIG. 6). At step 1304, the interactive media guidance application sets the scan sequence for the recorded programs and the on-demand programs selected in process 600. For example, the interactive media guidance application (FIG. 1), using the data for the selected programs provided by data source 124 (FIG. 1), sets a scan sequence for the programs (e.g., orders the programs by start-time, end-time, program length, or proximity of programs to the criteria).

At step 1306, the interactive media guidance application selects a program from the scan sequence. For example, the interactive media guidance application selects the first program of the scan sequence at the start of the scan. At step 1308, the interactive media guidance application determines whether the user has provided a "stop" instruction. For example, the interactive media guidance application may determine whether the user has pressed a key or key sequence associated with a "stop" instruction using input device 114 (FIG. 1). If the interactive media guidance application determines that the user has provided a "stop" instruction, process 1300 moves to step 1310 and ends.

If, at step 1308, the interactive media guidance application instead determines that the user has not provided a "stop" instruction, process 1300 moves to step 1312. At step 1312, the interactive media guidance application determines whether the selected program was previously displayed. For example, the interactive media guidance application determines whether the scan has previously reached the selected program in the scan sequence. As another example, the interactive media guidance application may determine whether the program has a marked playback position. If the interactive media guidance application determines that the program was not previous displayed, process 1300 moves to step 1314. At step 1314, the interactive media guidance application displays the selected program in a video window. For example, the interactive media guidance application directs display device 112 (FIG. 1) to display the program in video window 702 (FIG. 7A). In some embodiments, for stored or on-demand programs, the interactive media guidance application may first or in advance determine whether the portion of the content to be displayed from the currently marked position is unavailable (e.g., at a commercial break). If the interactive media guidance application determines that the program is unavailable, the interactive media guidance application may skip past the commercials before or while the scan is being displayed. At step 1316, the interactive media guidance application determines whether the scan length for the program has been reached. For example, the interactive media guidance application compares the time that the program has been displayed in the video window with the scan length (e.g., 5 seconds). If the interactive media guidance application determines that the scan length has not been reached, process 1300 returns to step 1316 and continues to monitor the time that the program has been displayed in the video window.

If, at step 1316, the interactive media guidance application instead determines that the scan length has been reached, process 1300 moves to step 1318. At step 1318, the interactive media guidance application marks the current playback position of the program. For example, the interactive media guidance application may mark, in recording device 118 (FIG. 1), the playback position of the selected recorded program. As another example, the interactive media guidance application may direct an on-demand server to pause the program and to mark the paused playback position. Process 1300 then returns to step 1306 and selects another program from the scan sequence.

If, at step 1312, the interactive media guidance application instead determines that the program has been previously displayed process 1300 moves to step 1320. At step 1320, the interactive media guidance application identifies the marked playback position at which the identified program was last displayed. For example, the interactive media guidance application may identify the playback position for the recorded program that was marked at step 1318 during a prior scan of this program. As another example, the interactive media guidance application may request that the on-demand server that provided the program in an on-demand stream play back the program from the previously paused playback position.

At step 1322, the interactive media guidance application displays the program from the marked playback position. For example, the interactive media guidance application may direct display device 112 to display the program from the marked playback position. In some embodiments, the scan playback mark may be distinct from one or more pause points that are associated with a stored or on-demand program. At step 1324, the interactive media guidance application determines whether the scan length for the program has been reached. For example, the interactive media guidance application compares the time that the program has been displayed in the video window with the scan length (e.g., 5 seconds). If the interactive media guidance application determines that the scan length has not been reached, process 1300 returns to step 1324 and continues to monitor the time that the program has been displayed in the video window.

If, at step 1324, the interactive media guidance application instead determines that the scan length has been reached, process 1300 moves to step 1326. At step 1326, the interactive media guidance application marks the current playback position of the program. For example, the interactive media guidance application may mark, in recording device 118, the playback position of the selected recorded program. As another example, the interactive media guidance application may direct an on-demand server to pause the program and to mark the paused playback position. Process 1300 then returns to step 1306 and selects another program from the scan sequence.

In some embodiments, the user may record a program from a scan window without interrupting the scan. In addition, for recorded programs, on-demand programs, and other programs cached in memory, the interactive media guidance application may provide trick-play functionality as part of the scan. Illustrative process 1400 (FIG. 14) shows a method for providing these features.

Figure 14A:
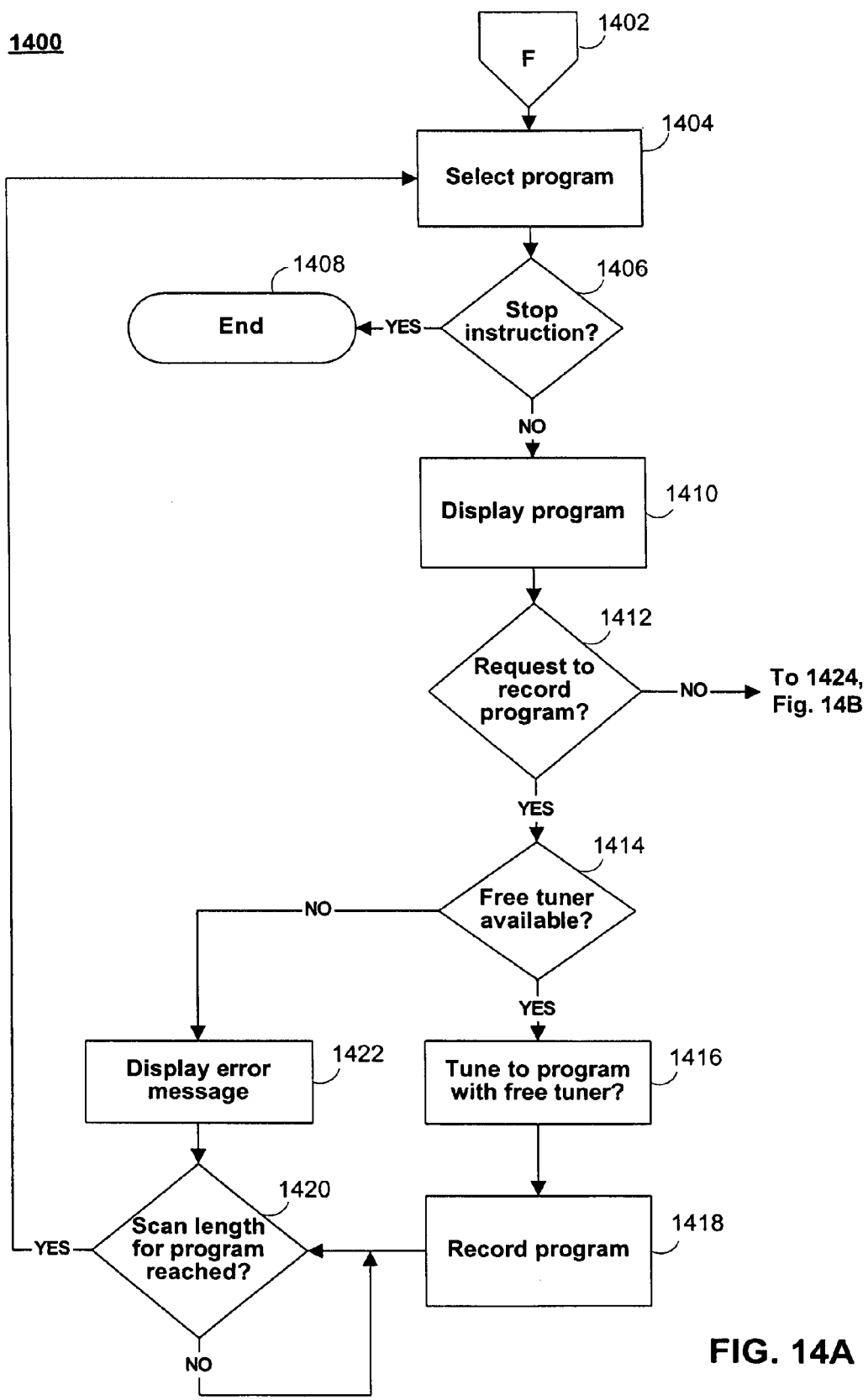
FIGS. 14A and 14B shows a flow chart of an illustrative process for providing recording and trick play functions in a scan in accordance with one embodiment of the present invention.
Figure 14B:
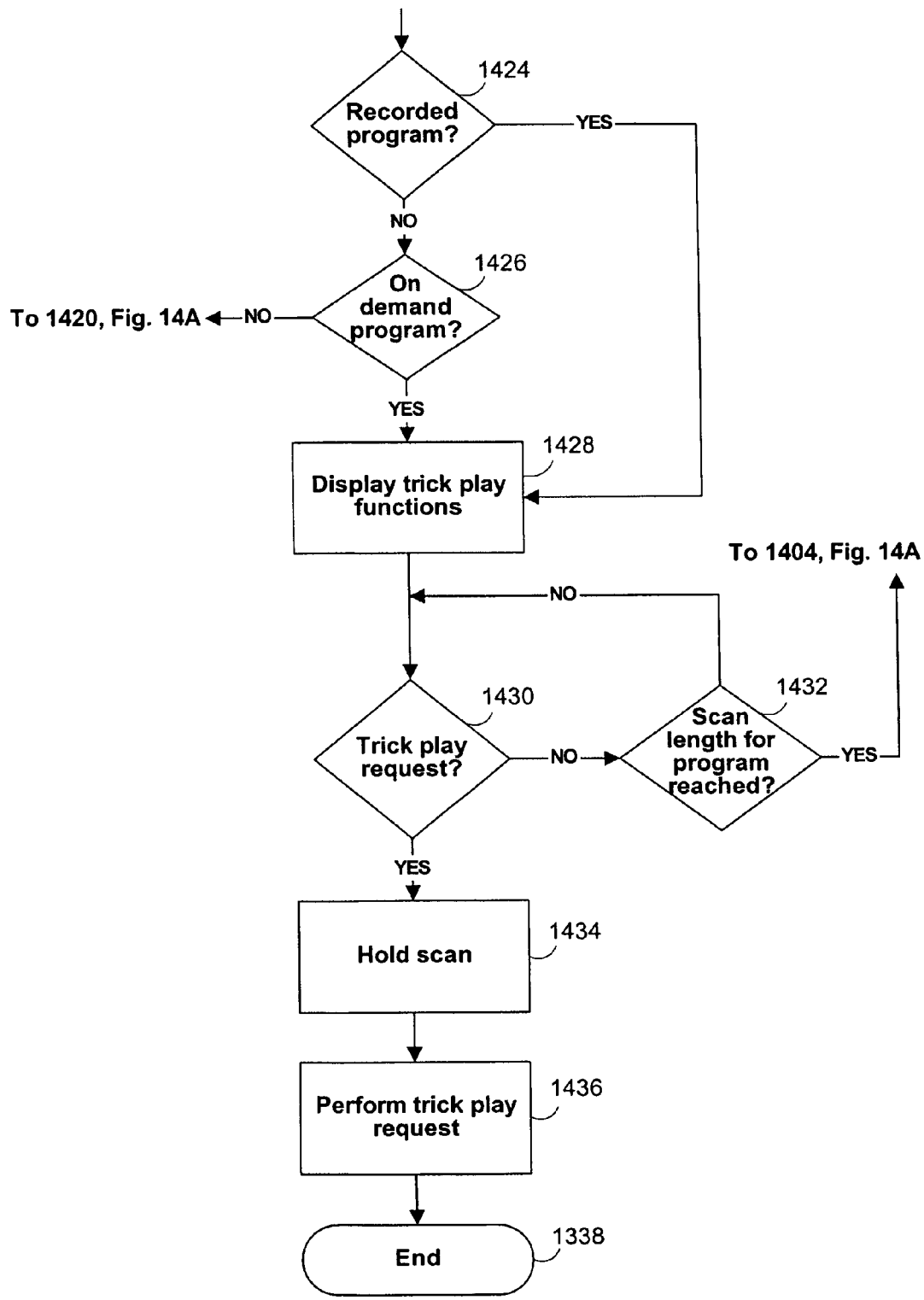

FIG. 14 shows illustrative process 1400 for recording scanned programs and for providing trick-play functionality. Process 1400 begins at step 1402, which corresponds to step 612 of FIG. 6. At step 1404, the interactive media guidance application selects a program from the scan sequence. For example, the interactive media guidance application selects the first program of the scan sequence at the start of the scan. At step 1406, the interactive media guidance application determines whether the user has provided a "stop" instruction. For example, the interactive media guidance application may determine whether the user has pressed a key or key sequence associated with a "stop" instruction using input device 114 (FIG. 1). If the interactive media guidance application determines that the user has provided a "stop" instruction, process 1400 moves to step 1408 and ends.

If, at step 1406, the interactive media guidance application instead determines that the user has not provided a "stop" instruction, process 1400 moves to step 1410. At step 1410, the interactive media guidance application displays the selected program. For example, the interactive media guidance application directs a tuner to tune to the channel of the selected program, and directs display device 112 (FIG. 1) to display the selected program. At step 1412, the interactive media guidance application determines whether the user has provided an instruction to record the selected program. For example, the interactive media guidance application may determine whether the user has pressed a key or key sequence associated with a "record" instruction using input device 114. If the interactive media guidance application determines that the user has provided a "record" instruction, process 1400 moves to step 1414. At step 1414, the interactive media guidance application determines whether the user's equipment (e.g., user equipment 110, FIG. 1) has an available tuner for recording the program. For example, the interactive media guidance application may determine whether all of the tuners of user equipment 110 are already assigned to different tasks (e.g., scanning programs, prior scheduled recording, or downloading an on-demand program). If the interactive media guidance application determines that the user's equipment has a free tuner, process 1400 moves to step 1416.

At step 1416, the interactive media guidance application tunes to the selected program. For example, the interactive media guidance application directs the free tuner identified at step 1414 to tune to the channel of the selected program. At step 1418, the interactive media guidance application records the program. For example, the interactive media guidance application directs recording device 118 (FIG. 1) to record the program of the channel to which the free tuner is tuned. In some embodiments, the interactive media guidance application may prompt the user to record a future occurrence of the program, set up a series recording, record programs similar to the selected current program, or perform any other recording related action (e.g., using a pop-up window). In some embodiments, the interactive media guidance application may hold the scan while the user sets up the recording. In some embodiments, the scan may continue (e.g., behind pop-up windows).

At step 1420, the interactive media guidance application determines whether the scan length for the program has been reached. For example, the interactive media guidance application compares the time that the program has been displayed in the video window with the scan length (e.g., 5 seconds). If the interactive media guidance application determines that the scan length has not been reached, process 1400 returns to step 1420 and continues to monitor the time that the program has been displayed in the video window.

If, at step 1420, the interactive media guidance application instead determines that the scan length has been reached, process 1400 moves to back to step 1404 and selects another program.

If, at step 1414, the interactive media guidance application instead determines that the user's equipment does not have a tuner available, process 1400 moves to step 1422. At step 1422, the interactive media guidance application displays an error message indicating that the selected program cannot be recorded. For example, the interactive media guidance application may direct display device 112 to display an error message. In some embodiments, the interactive media guidance application may display a conflict notice that prompts the user for instructions to free a tuner to record the selected program. In some embodiments, the interactive media guidance application may display a message asking the user if they would like to exit the scan to utilize the tuner to record the program. Process 1400 then moves to step 1420.

If, at step 1412, the interactive media guidance application instead determines that the user has not requested to record a program, process 1400 moves to step 1424. At step 1424, the interactive media guidance application determines whether the selected program is a recorded program. For example, the interactive media guidance application may determine whether the program is being provided by media source 120 or recording device 118. If the interactive media guidance application determines that the selected program is a recorded program, the interactive media guidance application moves to step 1428, which will be described in more detail below.

If, at step 1424, the interactive media guidance application instead determines that the selected program is not a recorded program, process 1400 moves to step 1426. At step 1426, the interactive media guidance application determines whether the selected program is an on-demand program. For example, the interactive media guidance application may determine whether the program is being provided on-demand by media source 120 or an on-demand server. In some embodiments, the interactive media guidance application may instead or in addition, at step 1426, determine whether the program is cached and whether trick-play functionality is enabled for the program. If the interactive media guidance application determines that the selected program is not an on-demand program, the interactive media guidance application moves to step 1420.

If, at step 1422, the interactive media guidance application instead determines that the program is an on-demand program, process 1400 moves to step 1428. At step 1428, the interactive media guidance application optionally displays selectable trick-play functions for the selected program. For example, the interactive media guidance application may replace the scan wizard with a scan dashboard that includes trick-play functions (e.g., scan dashboard 1500 of FIG. 15). As another example, the interactive media guidance application may replace scan control panel 708 of scan wizard 700 (FIG. 7A) with a trick-play control panel (e.g., panel 1508, FIG. 15). In some embodiments, the interactive media guidance application may automatically display the trick-play functions. In other embodiments, the interactive media guidance application may display an indication that trick-play functions are available, and display the actual trick-play functions in response to a user request. In some embodiments, the interactive media guidance application may not display any trick play functions, but trick play keys from a remote control may be enabled and processed when they are pressed.

At step 1430, the interactive media guidance application determines whether the user has requested a trick-play function. For example, the interactive media guidance application may determine whether the user has pressed a key or key sequence associated with a trick-play function using input device 114. If the interactive media guidance application determines that the user has not requested a trick-play function, process 1400 moves to step 1432. At step 1432, the interactive media guidance application determines whether the scan length for the program has been reached. For example, the interactive media guidance application compares the time that the program has been displayed in the video window with the scan length (e.g., 5 seconds). If the interactive media guidance application determines that the scan length has not been reached, process 1400 returns to step 1430 and continues to monitor for a trick-play request from the user.

If, at step 1432, the interactive media guidance application instead determines that the scan length has been reached, process 1400 moves to back to step 1404 and selects another program.

If, at step 1430, the interactive media guidance application instead determines that the user has requested a trick-play function, process 1400 moves to step 1434. At step 1434, the interactive media guidance application holds the scan. For example, the interactive media guidance application directs display device 112 to continue to display the selected program beyond the scan length. At step 1436, the interactive media guidance application performs the requested trick-play function. For example, the interactive media guidance application may fast-forward, rewind or pause the selected program. Process 1400 ends at step 1438.

Figure 15:
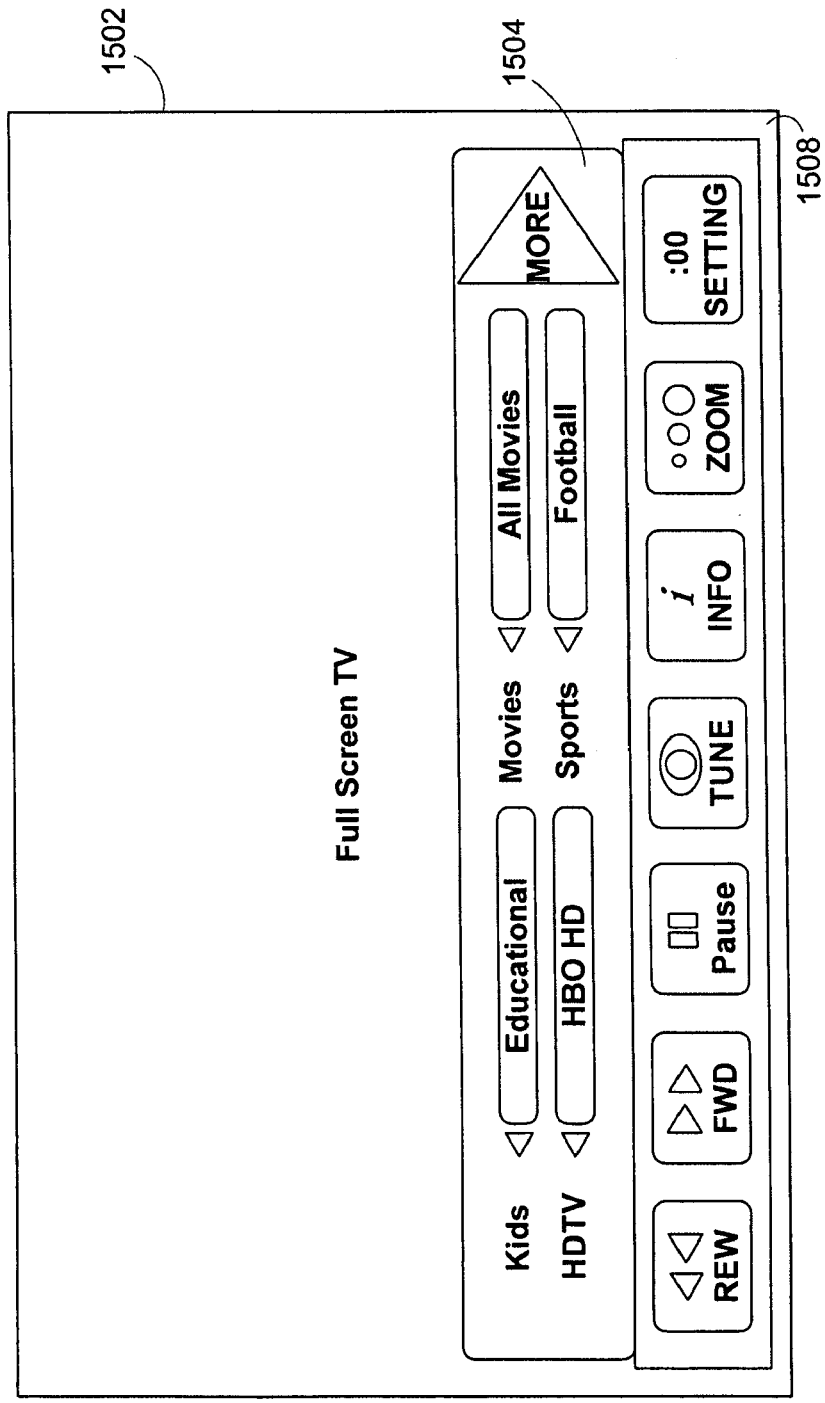
FIG. 15 shows an illustrative display screen of a scan dashboard in accordance with one embodiment of the present invention.

FIG. 15 shows an illustrative display screen of scan dashboard 1500 for providing trick-play functions for the user during a scan. Scan dashboard 1500 includes video window 1502, criteria panel 1506, and trick-play control panel 1508. Video window 1502 and criteria panel 1506 may function very similarly to video window 602 and criteria panel 606 of scan wizard 600 (FIG. 6).

Trick-play control panel 1508 may include any suitable trick-play control options. In the example shown in FIG. 15, trick-play control panel 1508 includes rewind, fast-forward, and pause options. In some embodiments, in response to a user selecting the pause option, the interactive media guidance application may replace the pause option with a play option to allow the user to resume the program.

In some embodiments, the user may select the criteria for a scan by selecting various categories and subcategories that correspond to program assets. In some embodiments, the interactive media guidance application may generate a series of categories and subcategories (e.g., game, documentaries, movies) when the user requests a scan. For example, the list of available categories and subcategories may be limited to those that have current programs available. The categories and subcategories may permit the user to dynamically switch between categories and subcategories so as to further narrow or further expand as the scan proceeds.

In some embodiments the interactive media guidance application may provide a rungs-ropes tree structure to allow users to specify certain hierarchical criteria for use by the scan feature. The tree structure may be displayed, for example, in criteria panel 706 of scan wizard 700 (FIG. 7A).

Figure 16:
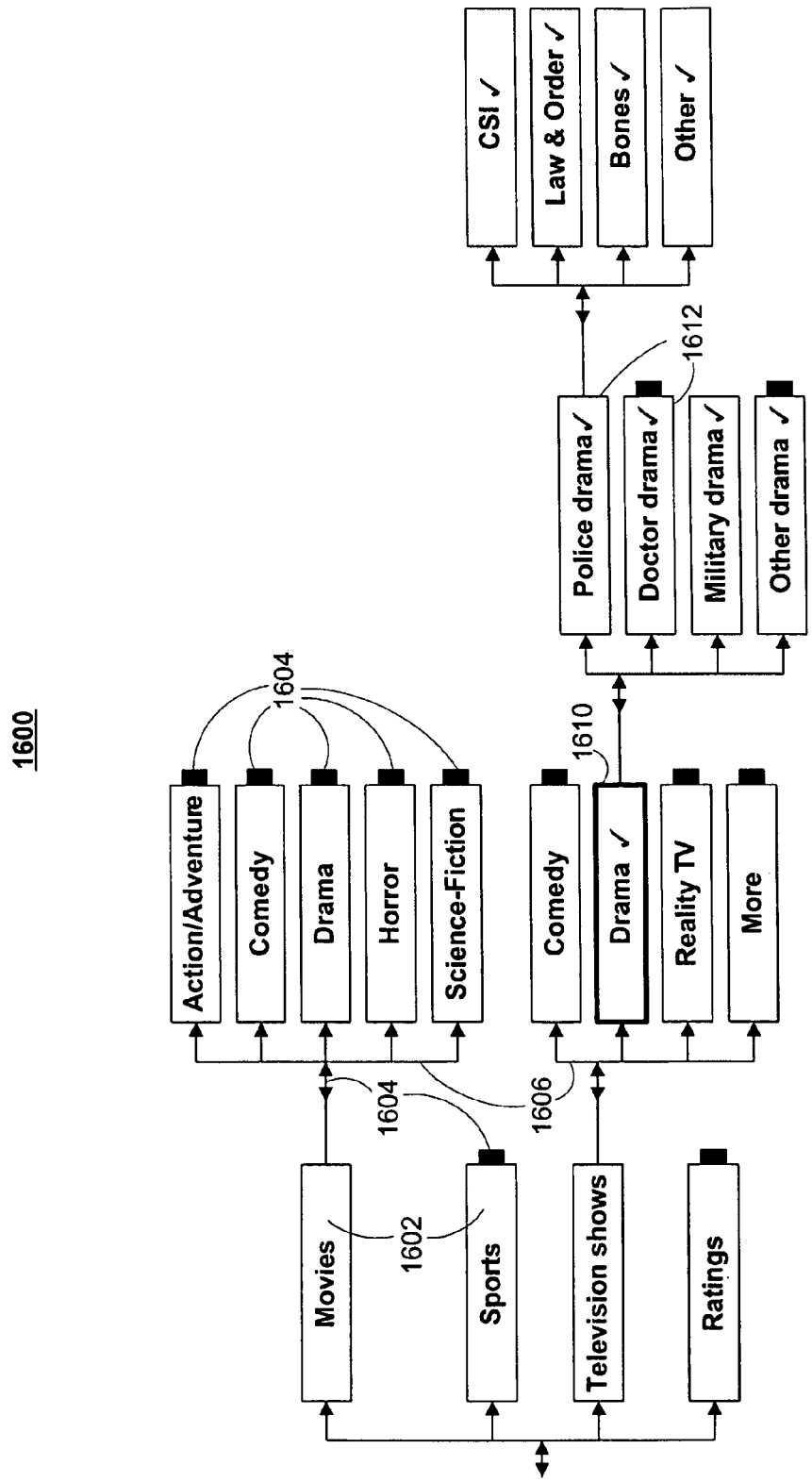
FIG. 16 shows an illustrative display of a criteria selecting structure in accordance with one embodiment of the present invention.

Illustrative tree structure 1600 is displayed in FIG. 16. Tree structure 1600 includes nodes 1602, rungs 1604, and ropes 1606. Nodes 1602 include categories and subcategories for organizing the criteria that the user may select for a scan. The user may select a rung associated with any node to expand or contract subcategories and/or criteria of the node. If node 702 does not have an associated rung 1604, then the node is a criterion that the user may select. In the example shown in FIG. 16, the shows "CSI," "Law & Order," "Bones" and "Other" are criteria that a user may select. In addition, the node "Military Drama" does not have any sub-nodes, and is therefore a criterion. However, the nodes "Police Drama," "Doctor Drama," and "Other Drama" all include rungs, and are therefore subcategories of the "Television shows" and "Drama" categories.

A user may in addition select a category or a subcategory as a scan criteria. If the user selects a category or subcategory, all of the subcategories and criteria in nodes following the category or subcategory are automatically selected. The user may select a category, subcategory, or criteria using highlight region 1610. When a category, subcategory, or criterion has been selected, the interactive media guidance application may mark the selected node(s) in any suitable manner (e.g., check mark 1612). In the example shown in FIG. 16, the user has selected the node "drama" and all of the subcategories and criteria of the node "drama" are indicated as having been selected (e.g., by check mark 1612).

The user may move across, expand and collapse single nodes of tree structure 1600 using directional keys on an input device (e.g., input device 114). The user may also expand or contract all levels of nodes below a selected node by selecting a page-up or page-down key on the input device (e.g., input device 114).

In some embodiments, the interactive media guidance application may display user interface features that allow users to view program listings for desired programs more easily. For example, some embodiments may include a "circler" feature. The circler is a component that circles a part of any screen to bring the user's attention to the content encompassed by the circle. It may be used in embodiments where the user input device is not a "point and click" type of device—where traditional TV remotes, and certain cell phone keypads are used. Such devices provide a set of arrow or number keys for allowing access to various parts of a display.

The circler provides advantages over other types of indicators, such as highlights, color codes, and icons. Highlights are used to simply point to the item where the cursor is positioned. One of the ways icons are used in the listing screen is to indicate if a program will be recorded. Icons tend to take up valuable space from the text, and can end up confusing the user. Finally, colors are also used extensively, to identify genres (movies, kids, sports etc) and are restricted to the colors that are going to be most effective against other background colors.

The circler provides another way users may filter programs that interest them. The circler may be any closed curve that is designed to maximize readability of the enclosed text. It is drawn by the guide when a particular item (say a listing) satisfies a certain set of criteria. For example, suppose the user has set "Action movies" as a favorite category. When the user is in the listing screen, and presses favorite key, all action movies will be circled. Circlers may also be used when, for example, the user enters a keyword for a search. All items on the screen that match the keyword will be circled. In some embodiments, the circler may be used to highlight the program from a program grid that is currently being displayed in a scan window.

Figure 17:
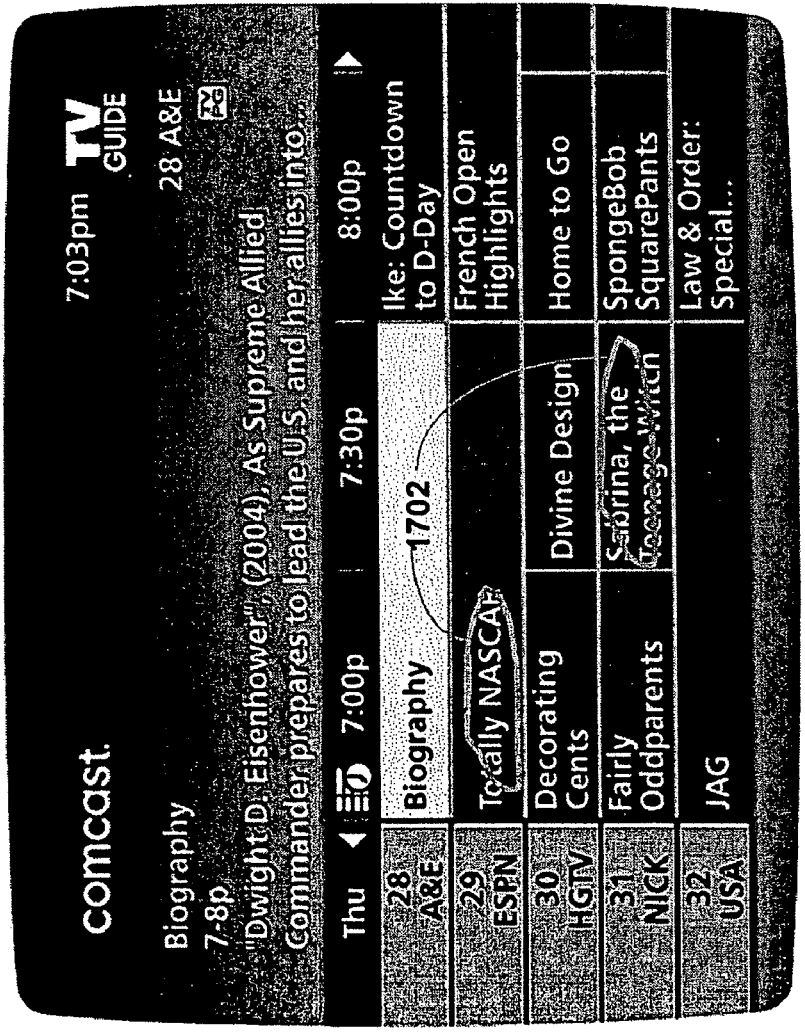
FIG. 17 shows an illustrative display of a circler for selecting criteria in accordance with one embodiment of the present invention.

Illustrative display screen 1700, shown in FIG. 17, shows an illustration of how circler 1702 may be used on the listing screen to identify specific programs. In this example, the user has selected criteria that has caused the interactive media guidance application to display circlers 1702 over the programs "Totally Nascar" and "Sabrina, the Teenage Witch." A listings screen is used only to illustrate the feature, as circlers may be provided in other types of guide displays.

Once a user has viewed program listings using the circlers, the user may select a listing element to tune to a program associated with that element. In response to the user selection, the guide may, for example, display the program and a FLIP display. When the user enters the scan mode from the program, the guide may scan currently-available assets according to the criteria used to provide the circlers. For example, if the user has identified programs of certain categories in a listings display using circlers, the interactive media guidance application may scan through the identified programs in response to a user request to initiate a scan.

FIGS. 18-23 show other embodiments for allowing users to select scan criteria. In these embodiments, users may set favorite categories, channels and titles from various "favorites" screens. During a scan, the guide tunes to channels based on these criteria. The screens of FIGS. 19-23 may be used in connection with some embodiments in which channels, categories and/or titles are selected as scan criteria. For example, the wizard feature described above may include elements of these screens.

Figure 18:
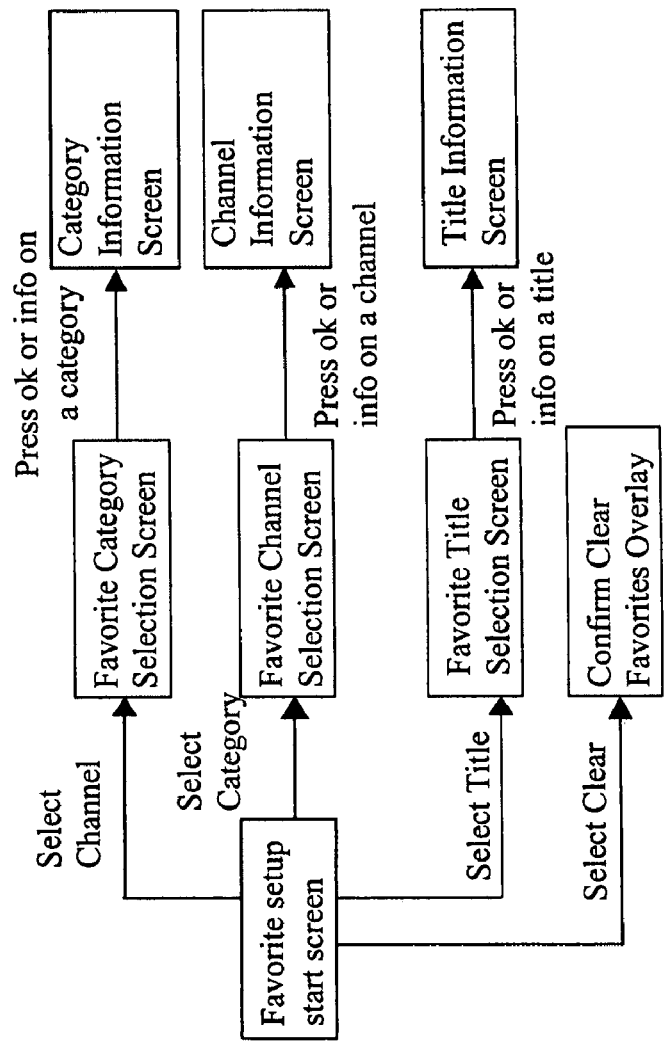
FIG. 18 shows an illustrative flow chart for selecting criteria for a scan from a "Favorite" screen in accordance with one embodiment of the present invention.

FIG. 18 is an illustrative flowchart 1800 that shows a high-level overview of the flow control of the illustrative screens of FIGS. 19-23. Each screen and its operation will be described in more detail below.

Figure 19:
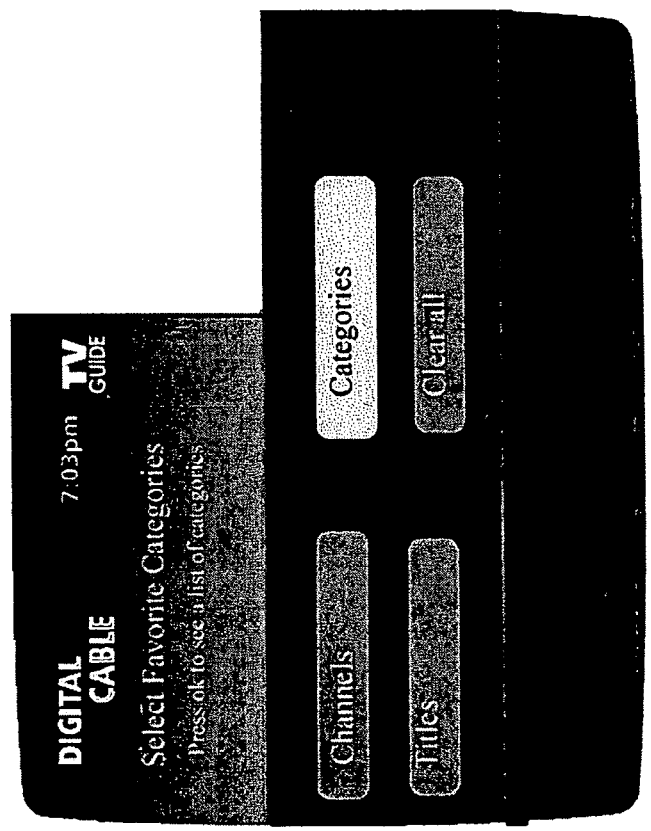
FIGS. 19-23 show illustrative "Favorite" screens in accordance with one embodiment of the present invention.

The first screen, called the "Favorite Setup Start" screen allows the user to pick which of the three modes the user would like to use as a means of selecting favorites. FIG. 19 shows an illustrative Favorite Setup Start Screen 1900. In addition to choosing between channels, categories and titles, the user is given the option of clearing all favorites.

Navigation between the buttons of FIG. 19 is done through the regular arrow keys (up, down, right, left) on the remote control. The instant information area is updated according to the button selected. Pressing ok in any of the first three buttons takes the user to another full screen depending on the choice, as described below, for example, in connection with FIGS. 20 and 21. Selecting the fourth button (Clear all), results in a confirmation overlay with the option of canceling the clear request.

Figure 20:
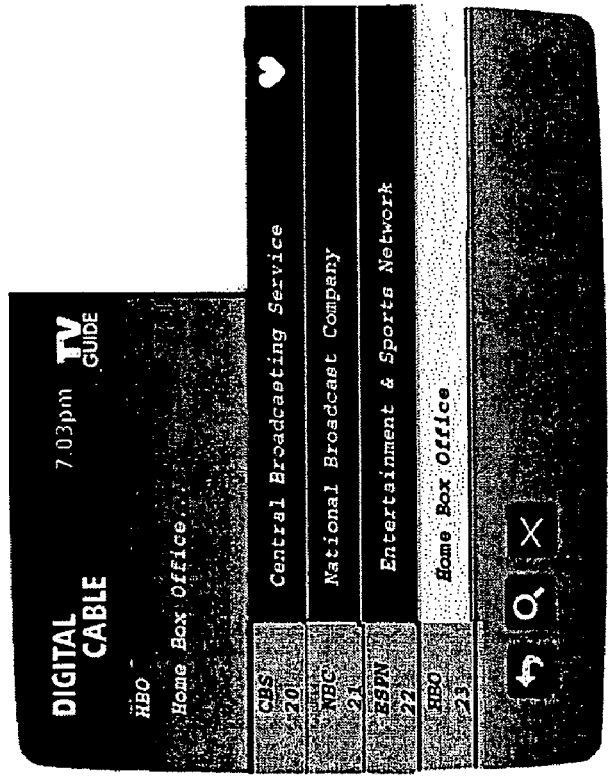

FIG. 20 shows an illustrative favorite channel selection screen 2000. When a channel in the list is selected, the favorite key toggles the inclusion of the channel in the favorite list used by the scan feature. The user may use the up and down arrow keys and the page up and page down keys to navigate the list. The down arrow key from the last item in the list takes the user to the action button panel at the bottom of the screen. The up arrow key from the action button panel takes the user to the list of channels. The left and right arrow keys allow the user to move between the buttons. Selecting "OK" or "Info" in any of the channels in the list take the user to the channel info selection screen (e.g., similar to category information screen 2200 of FIG. 22. The user may select titles instead of channels using a similar approach.

Figure 21:
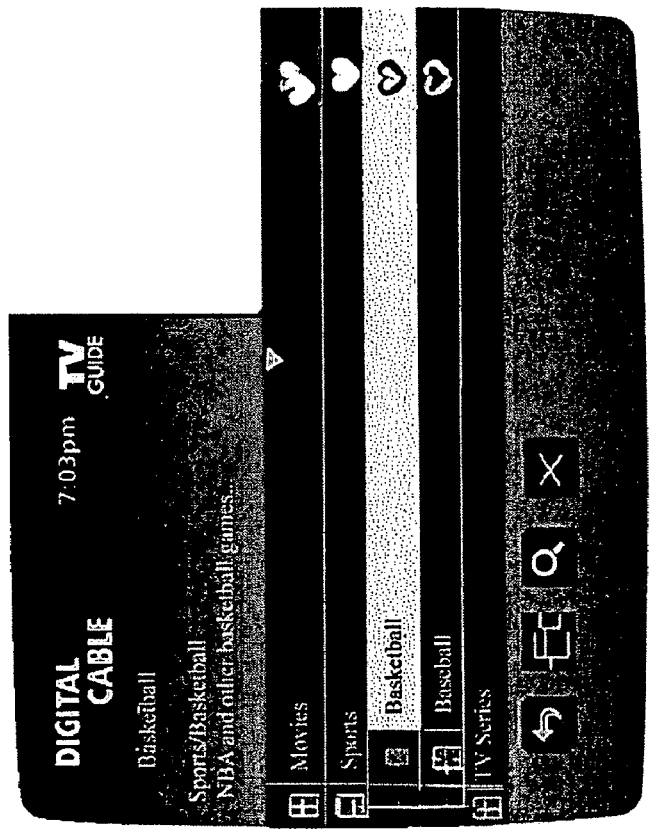

FIG. 21 shows an illustrative favorite category selection screen 2100. In this embodiment, a ropes-rungs tree is used to allow for the navigation and selection of favorite categories. When the user positions the cursor on a category, the up and down arrows take the user to the node above and below respectively. The page up and page down buttons scroll the page for the user. The user may navigate to the action button panel using the arrow keys from the last visible category. Selecting ok or info on a category takes the user to the category info screen.

Figure 22:
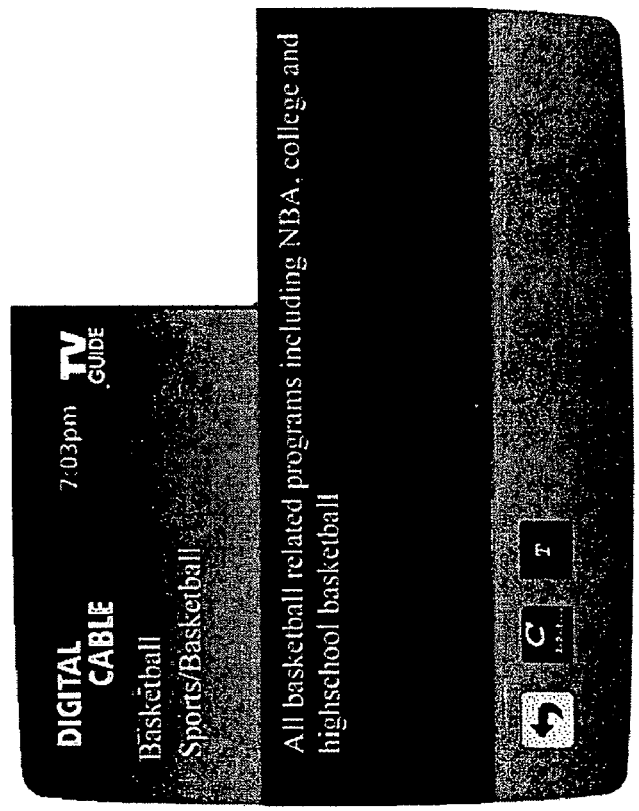

FIG. 22 shows an illustrative category information screen 2200 that may be displayed in response to the user selecting a category from the categories selection screen.

The content of the information screen may change based on the action button selected by the user. When the back button is selected, the guide may return to the previous screen, such as screen 2100 of FIG. 21. When the user selects the "C" button, the guide may display a list of channels that are dedicated to this category, or that have programs matching this category in their schedule. For example, for the category "sports/basketball", channels like ESPN and other popular channels that carry basketball programming are displayed. In response to the user selecting the "T" button, the guide may display program titles that match the category. For example, this list may include programs involving basketball matches and teams across all channels.

Action buttons on information screens, such as that shown in FIG. 22, are navigable using arrow buttons. Page up and page down may be used to scroll the description if it is longer than a single page.

It will be understood that the functionality and layout of the illustrative category information screen of FIG. 22 may also be used for program and channel information screens. The action button choices for a channel information screen may include buttons that cause the application to display lists of program categories and program titles carried by that channel. Action button choices for a program information screen may include buttons that cause the application to display lists of channels and categories associated with that program.

Figure 23:
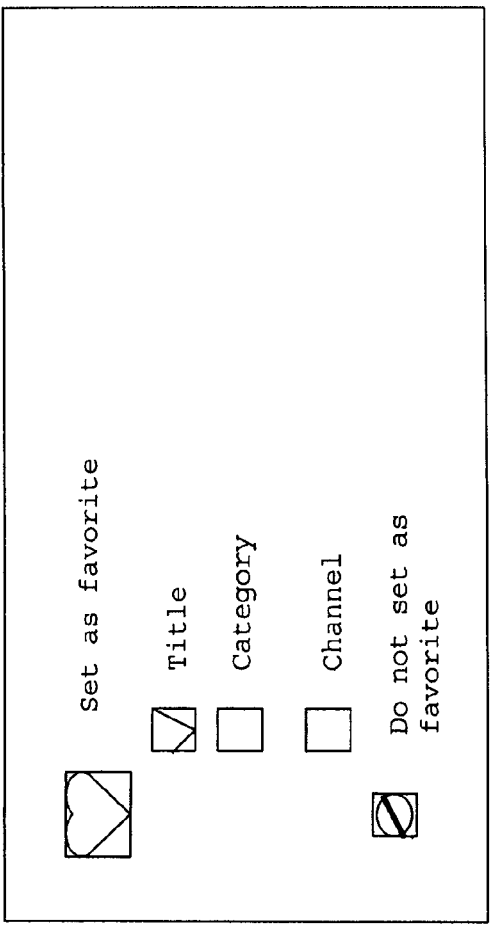

FIG. 23 shows an illustrative selection box 2300 for selecting favorite criteria from program information screens. These checkboxes let the users specify what they want to set as favorite—the program itself, its category, or the channel on which it airs. In some embodiments, title may be selected as a default. In some embodiments, category and channel are selected by default. In some embodiments, multiple category selections may be available if the program is assigned to multiple categories and subcategories.

The user may navigate between the two buttons, "Set As favorite" and "Do not set as favorite" using the up/down arrow keys. The left right arrow keys are used to move the cursor to the check boxes. The ok button toggles the state of the check box.

Figure 24:
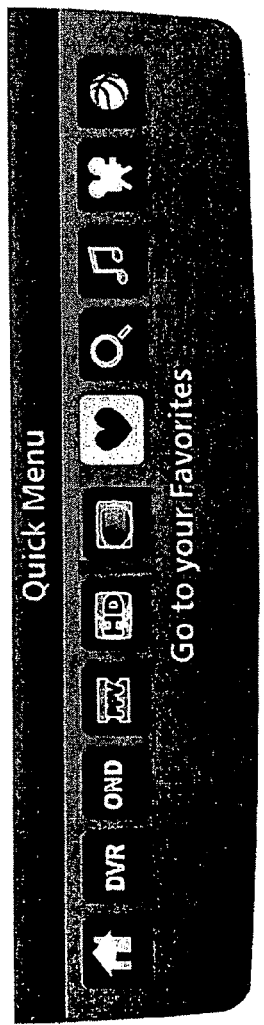
FIG. 24 shows an illustrative quick menu in accordance with one embodiment of the present invention.

FIG. 24 shows an illustrative quick menu display that includes a start scan button (the button to the left of the highlighted favorites button) that the user may select to start a scan. In the embodiment of FIG. 24, the user may also start the scan by "double clicking" the favorite button (the heart-shaped button). A double click is two presses of a select button while the favorite button is highlighted within, for example, 1 second.

Figures 25, 26, 27:
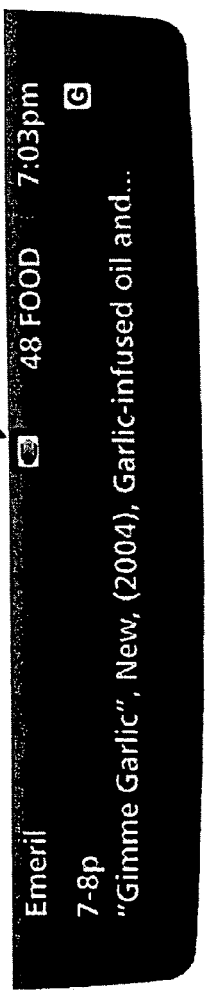

In some embodiments, the scan feature may include two different overlays depending on whether favorites criteria have been set or not. The overlays, examples of which are shown in FIGS. 25 and 26, may be provided at the beginning of the scan. For example, the overlays may time out in three seconds, and the scan stays on the first program five more seconds before moving on to the next program. The overlays may be displayed on the center of the screen and pressing exit or ok dismisses the overlay.

FIG. 25 shows an illustrative overlay 2500 that may be displayed by the scan feature when favorites have not been set. FIG. 26 shows an illustrative overlay 2600 that may be displayed by the scan feature when favorites criteria have been set.

During the scan process, a flip bar may be displayed. FIG. 27 shows an illustrative FLIP bar 2700 that includes an animated icon (similar to the scan icon on the Quick Menu) next to the channel information. If the scan wizard is not displayed, the flip bar may remain displayed for the entire period of the scan, displaying information about the currently viewed program.

The user may exit a scan by pressing an exit key, or by accessing the quick menu and selecting the scan button. FIG. 28 shows an illustrative overlay 2800 that may be displayed when the user exits the scan.

While the user interacts with the scan (e.g., access an info screen, sets reminders/recordings, view upcoming times etc.), the scan pauses. The user may also pause a scan by pressing a suitable key, such as the ok key or by selecting a Hold option from a scan control panel. The ok key pauses the scan, and if there is no user interaction, the scan mode ends after 10 seconds. FIG. 29 shows an illustrative overlay that is displayed when the user pauses a scan. In addition to displaying the overlay, the guide may stop the animation of the scan button on the flip bar and make it static.

The illustrative favorites and information screens shown in FIGS. 19-22 (and the quickmenu display of FIG. 23) include various icons that provide the user with quick access to features for setting scan criteria. FIGS. 30A and 30B show table 3000A and 3000B of the icons and their functions. As indicated in the table, some of the icons may also be provided in other guide displays such as quick menus, FLIP and BROWSE overlays and other displays.

FIG. 31 shows table 3100 of illustrative actions that may be taken by the guide in some embodiments when the user presses various keys on a remote control during the scan process. In some embodiments, the user may press the info key and menu keys to bring up the info screen and quick menu respectively.

The above described embodiments of the present invention are presented for purposes of illustration and not of limitation, and the present invention is limited only by the claims which follow. Furthermore, all of the flow charts and processes described above or illustrative. Steps may be added or removed to any of the flow charts, and steps may be performed in a different order.

What is claimed is:

1. A method for providing a video scan, comprising:
identifying programs from available programs for a scan, wherein the available programs comprise at least one non-on-demand program, at least one recording in progress, at least one recorded program, and at least one on-demand program;
automatically sequentially displaying the identified programs in the order defined by a scan sequence, wherein the displayed identified programs include at least one non-on-demand program that has not been recorded and at least one on-demand or recorded program;
determining whether a currently displayed program in the scan sequence is a recorded program, a recording in progress, or an on-demand program;
in response to determining that the currently displayed program in the scan sequence is a recorded program, a recording in progress, or an on-demand program, enabling trick play functions;
receiving a user request to perform a trick play function;
holding the scan at a position in the scan sequence in response to receiving the user request to perform the trick play function;
performing the requested trick play function; and
resuming the scan at the position in the scan sequence after performing the requested trick play function.

2. The method of claim 1 further comprising:
determining whether a particular program in the scan sequence is substantially at or nearly approaching a commercial; and
in response to determining that the particular program in the scan sequence is substantially at or nearly approaching commercial, skipping the particular program in the scan sequence.

3. The method of claim 1, wherein the available programs comprise at least one purchased pay-per-view program and at least one program for which the user has set a reminder.

4. The method of claim 1 further comprising:
determining criteria for the scan; and
wherein identifying programs for the scan comprises identifying programs related to the determined criteria.

5. The method of claim 4, wherein determining criteria for a scan comprises receiving a user selection of a criteria for the scan.

6. The method of claim 5, wherein receiving a user selection of criteria for the scan comprises receiving a user selection of at least one node in a tree structure display of criteria.

7. The method of claim 4 further comprising:
receiving a user indication of a proximity threshold; and
wherein identifying programs for the scan comprises identifying the programs that are related to the determined criteria and that satisfy the proximity threshold.

8. The method of claim 1, further comprising simultaneously displaying a video window for the scanned programs, selectable criteria for selecting the programs, and scan instruction buttons.

9. The method claim of claim 1, wherein enabling the trick play functions comprises enabling trick play keys on a remote control in response to determining that the currently displayed program in the scan sequence is a recorded program, a recording in progress, or an on-demand program.

10. A system for providing a video scan, comprising a display device and control circuitry, the control circuitry configured to:
identify programs from available programs for a scan, wherein the available programs comprise at least one non-on-demand program, at least one recording in progress, at least one recorded program, and at least one on-demand program;
direct the display device to automatically sequentially display the identified programs in the order defined by a scan sequence, wherein the displayed identified programs include at least one non-on-demand program that has not been recorded and at least one on-demand or recorded program;
determine whether a currently displayed program in the scan sequence is a recorded program, a recording in progress, or an on-demand program;
in response to determining that the currently displayed program in the scan sequence is a recorded program, a recording in progress, or an on-demand program, enable trick play functions;
receive a user request to perform a trick play function;
hold the scan at a position in the scan sequence in response to receiving the user request to perform the trick play function;
perform the requested trick play function; and
resume the scan at the position in the scan sequence after performing the requested trick play function.

11. The system of claim 10 wherein the control circuitry is further configured to:
determine whether a particular program in the scan sequence is substantially at or nearly approaching a commercial; and
in response to determining that the particular program in the scan sequence is substantially at or nearly approaching commercial, skip the particular program in the scan sequence.

12. The system of claim 10, wherein the available programs comprise at least one purchased pay-per-view program and at least one program for which the user has set a reminder.

13. The system of claim 10 wherein the control circuitry is further configured to:
determine criteria for the scan; and
identify programs related to the determined criteria.

14. The system of claim 13, wherein the control circuitry is further configured to receive a user selection of a criterion for the scan.

15. The system of claim 14, wherein the control circuitry is further configured to receive a user selection of at least one node in a tree structure display of criteria.

16. The system of claim 13 wherein the control circuitry is further configured to:
receive a user indication of a proximity threshold; and
identify the programs that are related to the determined criteria and that satisfy the proximity threshold.

17. The system of claim 10, wherein the control circuitry is further configured to direct the display device to simultaneously display a video window for the scanned programs, selectable criteria for selecting the programs, and scan instruction buttons.

* * * * *